(12) United States Patent
Tobler et al.

(10) Patent No.: US 12,106,509 B2
(45) Date of Patent: Oct. 1, 2024

(54) METHODS AND APPARATUSES FOR CORNER DETECTION

(71) Applicant: MAGIC LEAP, INC., Plantation, FL (US)

(72) Inventors: Christoph Tobler, Zurich (CH); Benjamin Langmann, Zurich (CH)

(73) Assignee: Magic Leap, Inc., Plantation, FL (US)

( * ) Notice: Subject to any disclaimer, the term of this patent is extended or adjusted under 35 U.S.C. 154(b) by 182 days.

(21) Appl. No.: 17/124,440

(22) Filed: Dec. 16, 2020

(65) Prior Publication Data

US 2021/0192782 A1 Jun. 24, 2021

Related U.S. Application Data

(60) Provisional application No. 62/951,768, filed on Dec. 20, 2019.

(51) Int. Cl.
| | |
|---|---|
| *G06V 10/44* | (2022.01) |
| *G06T 7/73* | (2017.01) |
| *G06T 11/00* | (2006.01) |
| *G06V 10/46* | (2022.01) |
| *G06V 10/771* | (2022.01) |

(Continued)

(52) U.S. Cl.
CPC ............... *G06T 7/73* (2017.01); *G06T 7/74* (2017.01); *G06T 11/00* (2013.01); *G06V 10/443* (2022.01); *G06V 10/462* (2022.01); *G06V 10/771* (2022.01); *G06V 20/10* (2022.01); *G06V 20/20* (2022.01)

(58) Field of Classification Search
CPC . G06T 7/74; G06T 11/00; G06T 2207/10016; G06T 7/246; G06T 7/73; G06V 10/443; G06V 10/462; G06V 20/10; G06V 10/771; G06V 20/20; G06K 9/6228
See application file for complete search history.

(56) References Cited

U.S. PATENT DOCUMENTS

| | | | |
|---|---|---|---|
| 2014/0010407 A1* | 1/2014 | Sinha | G06V 20/10 382/103 |
| 2020/0226762 A1* | 7/2020 | Milovanovic | G06T 19/006 |

OTHER PUBLICATIONS

E. Rosten, R. Porter and T. Drummond, "Faster and Better: A Machine Learning Approach to Corner Detection," in IEEE Transactions on Pattern Analysis and Machine Intelligence, vol. 32, No. 1, pp. 105-119, Jan. 2010, doi: 10.1109/TPAMI.2008.275. (Year: 2008).*

(Continued)

*Primary Examiner* — Amandeep Saini
*Assistant Examiner* — Denise G Alfonso
(74) *Attorney, Agent, or Firm* — Vista IP Law Group, LLP

(57) ABSTRACT

An apparatus configured for head-worn by a user, includes: a screen configured to present graphics for the user; a camera system configured to view an environment in which the user is located; and a processing unit coupled to the camera system, the processing unit configured to: obtain a feature detection response for a first image, divide the feature detection response into a plurality of patches having a first patch and a second patch, determine a first maximum value in the first patch of the feature detection response, and identify a first set of one or more features for a first region of the first image based on a first criterion that relates to the determined first maximum value.

27 Claims, 19 Drawing Sheets
(2 of 19 Drawing Sheet(s) Filed in Color)

(51) Int. Cl.
*G06V 20/10* (2022.01)
*G06V 20/20* (2022.01)

(56) References Cited

OTHER PUBLICATIONS

Barroso-Laguna, Axel, et al. "Key. net: Keypoint detection by handcrafted and learned cnn filters." Proceedings of the IEEE/CVF international conference on computer vision. 2019. (Year: 2019).*

* cited by examiner

| 0.75 | 1.48 | 4.25 | 10.26 | 6.56 | 4.18 | 3.36 | 15 | -74 | -1,729 | -13,320 | -102,812 | -454,314 | -1,257,219 | -2,510,054 | -3,821,714 |
|---|---|---|---|---|---|---|---|---|---|---|---|---|---|---|---|
| 0.30 | 0.51 | 4.05 | 15 | 11 | 0.43 | 11 | 36 | -3,301 | -48,452 | -265,094 | -989,740 | -2,488,757 | -4,079,414 | -4,898,389 | -4,682,475 |
| 0.16 | 3.29 | 17 | 28 | 17 | 3.04 | 51 | -424 | -31,360 | -302,481 | -946,020 | -1,986,451 | -3,769,091 | -4,575,391 | -3,651,705 | -2,179,556 |
| 0.24 | 1.77 | 6.28 | 9.04 | 8.52 | 23 | 135 | 1,311 | 37,856 | 726,442 | 3,692,763 | 6,280,878 | 3,225,514 | -390,413 | -711,390 | -261,087 |
| 0.28 | 0.95 | 2.39 | 9.36 | 17 | 26 | 201 | 9,981 | 370,322 | 4,231,164 | 15,609,046 | 22,892,191 | 14,237,608 | 3,857,558 | 563,651 | 47,959 |
| 0.56 | 1.58 | 1.57 | 6.25 | 9.04 | 6.43 | 172 | 7,844 | 244,726 | 2,603,031 | 9,285,478 | 12,837,644 | 6,097,665 | 180,072 | -464,270 | -121,039 |
| 1.33 | 3.04 | 1.20 | 2.20 | 5.45 | 3.33 | 31 | 851 | 10,533 | 43,172 | -129,295 | -1,797,464 | -5,099,822 | -5,728,566 | -3,841,276 | -1,696,680 |
| 2.36 | 3.77 | 2.81 | 1.92 | 2.66 | 7.43 | 13.44 | -32 | -4,391 | -73,446 | -493,965 | -1,777,380 | -3,951,430 | -5,979,279 | -6,640,824 | -5,376,322 |
| -101 | 822 | 452 | 1.78 | 1.22 | 2.50 | 4.53 | 9.76 | -138 | -2,652 | -27,509 | -176,243 | -776,060 | -2,299,504 | -4,468,469 | -6,084,993 |
| 2,456 | 30,184 | 955 | 3.24 | 2.19 | 2.44 | 1.61 | 1.02 | 0.11 | -3.06 | -151.92 | -3,483 | -39,508 | -261,158 | -1,024,583 | -2,557,814 |
| 1,243 | 16,584 | 505 | 2.18 | 2.89 | 4.12 | 2.10 | 1.00 | 0.17 | 0.04 | 0.04 | -15 | -353 | -5,795 | -53,564 | -285,532 |
| 882 | 795 | -482 | 3.36 | 4.42 | 9.46 | 8.04 | 4.21 | 0.56 | 0.06 | 0.06 | 0.23 | 3.10 | -2.70 | -317 | -5,294 |

| | | | | | | | | | | | |
|---|---|---|---|---|---|---|---|---|---|---|---|
| 3,821,714 | 4,682,475 | 2,179,556 | 261,087 | -47,959 | 121,039 | 1,696,680 | 5,376,322 | 6,084,993 | 2,557,814 | 285,532 | 5,294 |
| 2,510,054 | 4,898,389 | 3,651,705 | 711,390 | -563,651 | 464,270 | 3,841,276 | 6,640,824 | 4,468,469 | 1,024,583 | 53,564 | 317 |
| 1,257,219 | 4,079,414 | 4,575,391 | 390,413 | -3,857,558 | -180,072 | 5,728,566 | 5,979,279 | 2,299,504 | 261,158 | 5,795 | 2.70 |
| 454,314 | 2,488,757 | 3,769,091 | -3,225,514 | -14,237,608 | -6,097,665 | 5,099,822 | 3,951,430 | 776,060 | 39,508 | 353 | -3.10 |
| 102,812 | 989,740 | 1,986,451 | -6,280,878 | -22,892,191 | -12,837,644 | 1,797,464 | 1,777,380 | 176,243 | 3,483 | 15 | -0.23 |
| 13,320 | 265,094 | 946,020 | -3,692,763 | -15,609,046 | -9,285,478 | 129,295 | 493,965 | 27,509 | 152 | -0.04 | -0.06 |
| 1,729 | 48,452 | 302,481 | -726,442 | -4,231,164 | -2,603,031 | -43,172 | 73,446 | 2,652 | 3.06 | -0.04 | -0.06 |
| 74 | 3,301 | 31,360 | -37,856 | -370,322 | -244,726 | -10,533 | 4,391 | 138 | -0.11 | -0.17 | -0.56 |
| -15 | -36 | 424 | -1,311 | -9,981 | -7,844 | -851 | 32 | -9.76 | -1.02 | -1.00 | -4.21 |
| -3.36 | -11.16 | -50.81 | -135 | -201 | -172 | -31 | -13 | -4.53 | -1.61 | -2.10 | -8.04 |
| -4.18 | -0.43 | -3.04 | -23 | -26 | -6.43 | -3.33 | -7.43 | -2.50 | -2.44 | -4.12 | -9.46 |
| -6.56 | -.11 | -17 | -8.52 | -17.20 | -9.04 | -5.45 | -2.66 | -1.22 | -2.19 | -2.89 | -4.42 |
| -10 | -15 | -28 | -9.04 | -9.36 | -6.25 | -2.20 | -1.92 | -1.78 | -3.24 | -2.18 | -3.36 |
| -4.25 | -4.05 | -17 | -6.28 | -2.39 | -1.57 | -1.20 | -2.81 | -4.52 | -955 | -505 | 482 |
| -1.48 | -0.51 | -3.29 | -1.77 | -0.95 | -1.58 | -3.04 | -3.77 | -822 | -30,184 | -16,584 | -795 |
| -0.75 | -0.30 | -0.16 | -0.24 | -0.28 | -0.56 | -1.33 | -2.36 | 101 | -2,456 | -1,243 | -882 |

METHODS AND APPARATUSES FOR CORNER DETECTION

RELATED APPLICATION DATA

This application claims priority to, and the benefit of, U.S. Provisional Patent Application No. 62/951,768 filed on Dec. 20, 2019. The entire disclosure of the above application is expressly incorporated by reference herein.

FIELD

The present disclosure relates to head-worn image display devices, and methods and apparatus for detecting corners in images generated by head-worn image display devices.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario may involve presentation of digital or virtual image information as an augmentation to visualization of the real world around the user (i.e., transparency to real-world visual input). Accordingly, AR scenarios involve presentation of digital or virtual image information with transparency to the real-world visual input.

MR systems may generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems may employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exist in the brains (e.g., the optical centers) of a user of the head-worn display device when stimulated by light beams directed to the eyes of the user.

In some cases, a head-worn image display device may display virtual objects with respect to a real environment, and/or may allow a user to place and/or manipulate virtual objects with respect to the real environment. In such cases, the image display device may be configured to localize the user with respect to the real environment, so that virtual objects may be correctly displaced with respect to the real environment. Localization map may be used by head-worn image display device to perform localization. In particular, when performing localization, the image display device may obtain a real-time input image from camera system of the image display device, and match features in the input image with features of the localization map.

Methods and apparatuses for detecting features, such as corners, edges, or any user-defined features, in images are described herein. The detected features may be utilized to create localization maps. Alternatively, the features may be detected from input images for matching with features of localization map for localization of a user.

SUMMARY

Methods and apparatuses for detecting features, such as corners, in images are described herein. In some embodiments, the methods and apparatuses provide enough features, such as corners, even in darker environments. Such feature is advantageous because it allows localization and tracking of a user of a MR system in low light environment.

An apparatus configured for head-worn by a user, includes: a screen configured to present graphics for the user; a camera system configured to view an environment in which the user is located; and a processing unit coupled to the camera system, the processing unit configured to: obtain a corner detection response for a first image, divide the corner detection response into a plurality of patches having a first patch and a second patch, determine a first maximum value associated with the first patch of the corner detection response, and identify a first set of one or more corners for a first region of the first image based on a first criterion that relates to the determined first maximum value.

Optionally, the first maximum value is a value in the first patch of the corner detection response.

Optionally, the processing unit is also configured to obtain a relative factor, and multiply the maximum value by the relative factor to obtain a first threshold value.

Optionally, the processing unit is also configured to obtain a second threshold value, the second threshold value being an absolute threshold.

Optionally, the criterion comprises a criterion value that is the larger of the first threshold value and the second threshold value.

Optionally, the processing unit is configured to identify response value(s) in the first patch of the corner detection response that is larger than the criterion value to identify the one or more corners in the first set.

Optionally, the processing unit is configured to identify the one or more corners in the first set also based on a second criterion having a mask size for non-maxima suppression.

Optionally, the mask size for the non-maxima suppression is 3×3.

Optionally, the non-maxima suppression is for eliminating duplicate detected corners within a moving mask having the mask size.

Optionally, the processing unit is configured to determine a pixel in the first region of the first image as a corner (1) if a response value in the corner detection response for the first pixel is larger than a criterion value obtained based on the first maximum value, and (2) if the response value for the first pixel is larger than all surrounding values in a mask with the mask size.

Optionally, the condition (1) is the first criterion, and the condition (2) is the second criterion.

Optionally, the processing unit is also configured to: determine a second maximum value in the second patch of the corner detection response, and identify a second set of one or more corners in a second region of the first image based on a second criterion that relates to the second maximum value.

Optionally, the processing unit comprises an interface configured to obtain the first image.

Optionally, the processing unit is configured to obtain the corner detection response by performing corner detection on the first image, or by receiving the corner detection response from a device that is configured to perform corner detection on the first image.

Optionally, the processing unit comprises a corner detector configured to perform the corner detection.

Optionally, the corner detector is configured to perform the corner detection based on a Scale-Invariant Feature Transform (SIFT) algorithm, a Features from Accelerated Segment Test (FAST) algorithm, or a Shi-Thomasi algorithm.

Optionally, the processing unit comprises a divider configured to divide the corner detection response into the plurality of patches.

Optionally, the processing unit comprises a selector configured to select a response value from a plurality of response values in the corner detection response that has the highest value as the first maximum value.

Optionally, the processing unit is configured to determine a pixel in the first region of the first image as a corner (1) if a response value in the corner detection response for the first pixel is larger than a criterion value obtained based on the first maximum value, and (2) if the response value for the first pixel is larger than all surrounding values in a non-maxima suppression mask.

Optionally, the processing unit is configured to create a map based at least in part on the first set of the one or more corners, and to perform localization of the user based on the created map.

Optionally, the processing unit is configured to operate the screen to display a graphic representing the one or more corners in the first set.

Optionally, the apparatus further includes a non-transitory medium for storing information regarding the first set of the one or more corners.

A method performed by a head-worn image display device, includes: obtaining a corner detection response for a first image; dividing the corner detection response into a plurality of patches having a first patch and a second patch; determining a first maximum value associated with the first patch of the corner detection response; and identifying a first set of one or more corners for a first region of the first image based on a first criterion that relates to the determined first maximum value.

Optionally, the first maximum value is a value in the first patch of the corner detection response.

Optionally, the method further includes obtaining a relative factor, and multiplying the maximum value by the relative factor to obtain a first threshold value.

Optionally, the method further includes obtaining a second threshold value, the second threshold value being an absolute threshold.

Optionally, the criterion comprises a criterion value that is the larger of the first threshold value and the second threshold value.

Optionally, the act of identifying the first set of one or more corners comprises identifying response value(s) in the first patch of the corner detection response that is larger than the criterion value to identify the one or more corners in the first set.

Optionally, the one or more corners in the first set is identified also based on a second criterion having a mask size for non-maxima suppression.

Optionally, the mask size for the non-maxima suppression is 3×3.

Optionally, the non-maxima suppression is for eliminating duplicate detected corners within a moving mask having the mask size.

Optionally, the act of identifying comprises determining a pixel in the first region of the first image as a corner (1) if a response value in the corner detection response for the first pixel is larger than a criterion value obtained based on the first maximum value, and (2) if the response value for the first pixel is larger than all surrounding values in a mask with the mask size.

Optionally, the condition (1) is the first criterion, and the condition (2) is the second criterion.

Optionally, the method further includes: determining a second maximum value in the second patch of the corner detection response, and identifying a second set of one or more corners in a second region of the first image based on a second criterion that relates to the second maximum value.

Optionally, the act of obtaining the first image is performed by an interface of a processing unit.

Optionally, the act of obtaining the corner detection response comprises performing corner detection on the first image, or receiving the corner detection response from a device that is configured to perform corner detection on the first image.

Optionally, the act of obtaining the corner detection response comprises performing corner detection on the first image.

Optionally, the corner detection is performed by a corner detector based on a Scale-Invariant Feature Transform (SIFT) algorithm, a Features from Accelerated Segment Test (FAST) algorithm, or a Shi-Thomasi algorithm.

Optionally, the act of dividing the corner detection response is performed by a divider.

Optionally, the act of determining the first maximum value is performed by a selector selecting a response value from a plurality of response values in the corner detection response that has the highest value as the first maximum value.

Optionally, the act of identifying comprises determining a pixel in the first region of the first image as a corner (1) if a response value in the corner detection response for the first pixel is larger than a criterion value obtained based on the first maximum value, and (2) if the response value for the first pixel is larger than all surrounding values in a non-maxima suppression mask.

Optionally, the method further includes creating a map based at least in part on the first set of the one or more corners, and performing localization of the user based on the created map.

Optionally, the method further includes operating a screen to display a graphic representing the one or more corners in the first set.

Optionally, the method further includes storing information regarding the first set of the one or more corners in a non-transitory medium.

A non-transitory medium includes instructions, an execution of which by a processing unit of a head-worn image display device will cause the method to be performed.

A non-transitory medium includes instructions, an execution of which by a processing unit of a head-worn image display device will cause a method to be performed, the method comprising: obtaining a corner detection response for a first image; dividing the corner detection response into a plurality of patches having a first patch and a second patch; determining a first maximum value associated with the first patch of the corner detection response; and identifying a first set of one or more corners for a first region of the first image based on a first criterion that relates to the determined first maximum value.

An apparatus configured for head-worn by a user, includes: a screen configured to present graphics for the user; a camera system configured to view an environment in which the user is located; and a processing unit coupled to the camera system, the processing unit configured to: obtain a feature detection response for a first image, divide the feature detection response into a plurality of patches having a first patch and a second patch, determine a first maximum value associated with the first patch of the feature detection response, and identify a first set of one or more features for a first region of the first image based on a first criterion that relates to the determined first maximum value.

Optionally, the first maximum value is a value in the first patch of the feature detection response.

Optionally, the processing unit is also configured to obtain a relative factor, and multiply the maximum value by the relative factor to obtain a first threshold value.

Optionally, the processing unit is also configured to obtain a second threshold value, the second threshold value being an absolute threshold.

Optionally, the criterion comprises a criterion value that is the larger of the first threshold value and the second threshold value.

Optionally, the processing unit is configured to identify response value(s) in the first patch of the feature detection response that is larger than the criterion value to identify the one or more features in the first set.

Optionally, the processing unit is configured to identify the one or more features in the first set also based on a second criterion having a mask size for non-maxima suppression.

Optionally, the mask size for the non-maxima suppression is 3×3.

Optionally, the non-maxima suppression is for eliminating duplicate detected features within a moving mask having the mask size.

Optionally, the processing unit is configured to determine a pixel in the first region of the first image as a feature (1) if a response value in the feature detection response for the first pixel is larger than a criterion value obtained based on the first maximum value, and (2) if the response value for the first pixel is larger than all surrounding values in a mask with the mask size.

Optionally, the condition (1) is the first criterion, and the condition (2) is the second criterion.

Optionally, the processing unit is also configured to: determine a second maximum value in the second patch of the feature detection response, and identify a second set of one or more features in a second region of the first image based on a second criterion that relates to the second maximum value.

Optionally, the one or more features comprise one or more corners.

Optionally, the one or more features comprise one or more edges.

Optionally, the processing unit comprises an interface configured to obtain the first image.

Optionally, the processing unit is configured to obtain the feature detection response by performing feature detection on the first image, or by receiving the feature detection response from a device that is configured to perform feature detection on the first image.

Optionally, the processing unit comprises a feature detector configured to perform the feature detection.

Optionally, the feature detector is configured to perform the feature detection based on a Scale-Invariant Feature Transform (SIFT) algorithm, a Features from Accelerated Segment Test (FAST) algorithm, or a Shi-Thomasi algorithm.

Optionally, the processing unit comprises a divider configured to divide the feature detection response into the plurality of patches.

Optionally, the processing unit comprises a selector configured to select a response value from a plurality of response values in the feature detection response that has the highest value as the first maximum value.

Optionally, the processing unit is configured to determine a pixel in the first region of the first image as a feature (1) if a response value in the feature detection response for the first pixel is larger than a criterion value obtained based on the first maximum value, and (2) if the response value for the first pixel is larger than all surrounding values in a non-maxima suppression mask.

Optionally, the processing unit is configured to create a map based at least in part on the first set of the one or more features, and to perform localization of the user based on the created map.

Optionally, the processing unit is configured to operate the screen to display a graphic representing the one or more features in the first set.

Optionally, the apparatus further includes a non-transitory medium for storing information regarding the first set of the one or more features.

Optionally, the feature detection response comprises a corner detection response.

Optionally, the one or more features comprises one or more corners, one or more edges, or one or more user-defined shapes.

A method performed by a head-worn image display device, includes: obtaining a feature detection response for a first image; dividing the feature detection response into a plurality of patches having a first patch and a second patch; determining a first maximum value associated with the first patch of the feature detection response; and identifying a first set of one or more features for a first region of the first image based on a first criterion that relates to the determined first maximum value.

Optionally, the first maximum value is a value in the first patch of the feature detection response.

Optionally, the method further includes obtaining a relative factor, and multiplying the maximum value by the relative factor to obtain a first threshold value.

Optionally, the method further includes obtaining a second threshold value, the second threshold value being an absolute threshold.

Optionally, the criterion comprises a criterion value that is the larger of the first threshold value and the second threshold value.

Optionally, the act of identifying the first set of one or more features comprises identifying response value(s) in the first patch of the feature detection response that is larger than the criterion value to identify the one or more features in the first set.

Optionally, the one or more features in the first set is identified also based on a second criterion having a mask size for non-maxima suppression.

Optionally, the mask size for the non-maxima suppression is 3×3.

Optionally, the non-maxima suppression is for eliminating duplicate detected features within a moving mask having the mask size.

Optionally, the act of identifying comprises determining a pixel in the first region of the first image as a feature (1) if a response value in the feature detection response for the first pixel is larger than a criterion value obtained based on the first maximum value, and (2) if the response value for the first pixel is larger than all surrounding values in a mask with the mask size.

Optionally, the condition (1) is the first criterion, and the condition (2) is the second criterion.

Optionally, the method further includes: determining a second maximum value in the second patch of the feature detection response, and identifying a second set of one or more features in a second region of the first image based on a second criterion that relates to the second maximum value.

Optionally, the one or more features comprise one or more corners.

Optionally, the one or more features comprise one or more edges.

Optionally, the act of obtaining the first image is performed by an interface of a processing unit.

Optionally, the act of obtaining the feature detection response comprises performing feature detection on the first image, or receiving the feature detection response from a device that is configured to perform feature detection on the first image.

Optionally, the act of obtaining the feature detection response comprises performing feature detection on the first image.

Optionally, the feature detection is performed by a feature detector based on a Scale-Invariant Feature Transform (SIFT) algorithm, a Features from Accelerated Segment Test (FAST) algorithm, or a Shi-Thomasi algorithm.

Optionally, the act of dividing the feature detection response is performed by a divider.

Optionally, the act of determining the first maximum value is performed by a selector selecting a response value from a plurality of response values in the feature detection response that has the highest value as the first maximum value.

Optionally, the act of identifying comprises determining a pixel in the first region of the first image as a feature (1) if a response value in the feature detection response for the first pixel is larger than a criterion value obtained based on the first maximum value, and (2) if the response value for the first pixel is larger than all surrounding values in a non-maxima suppression mask.

Optionally, the method further includes creating a map based at least in part on the first set of the one or more features, and performing localization of the user based on the created map.

Optionally, the method further includes operating a screen to display a graphic representing the one or more features in the first set.

Optionally, the method further includes storing information regarding the first set of the one or more features in a non-transitory medium.

Optionally, the feature detection response comprises a corner detection response.

Optionally, the one or more features comprises one or more corners, one or more edges, or one or more user-defined shapes.

A non-transitory medium includes instructions, an execution of which by a processing unit of a head-worn image display device will cause the method to be performed.

A non-transitory medium includes instructions, an execution of which by a processing unit of a head-worn image display device will cause a method to be performed, the method comprising: obtaining a feature detection response for a first image; dividing the feature detection response into a plurality of patches having a first patch and a second patch; determining a first maximum value associated with the first patch of the feature detection response; and identifying a first set of one or more features for a first region of the first image based on a first criterion that relates to the determined first maximum value.

Additional and other objects, features, and advantages of the disclosure are described in the detail description, figures and claims.

BRIEF DESCRIPTION OF THE DRAWINGS

The drawings illustrate the design and utility of various embodiments of the present disclosure. This patent or application file contains at least one drawing executed in color. Copies of this patent or patent application publication with color drawings will be provided by the U.S. Patent and Trademark Office upon request and payment of the necessary fee. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 10-11 illustrate a method performed by the processing unit of FIG. 8.

FIGS. 14-15 illustrate a method performed by another processing unit.

DETAILED DESCRIPTION

Figure 1:
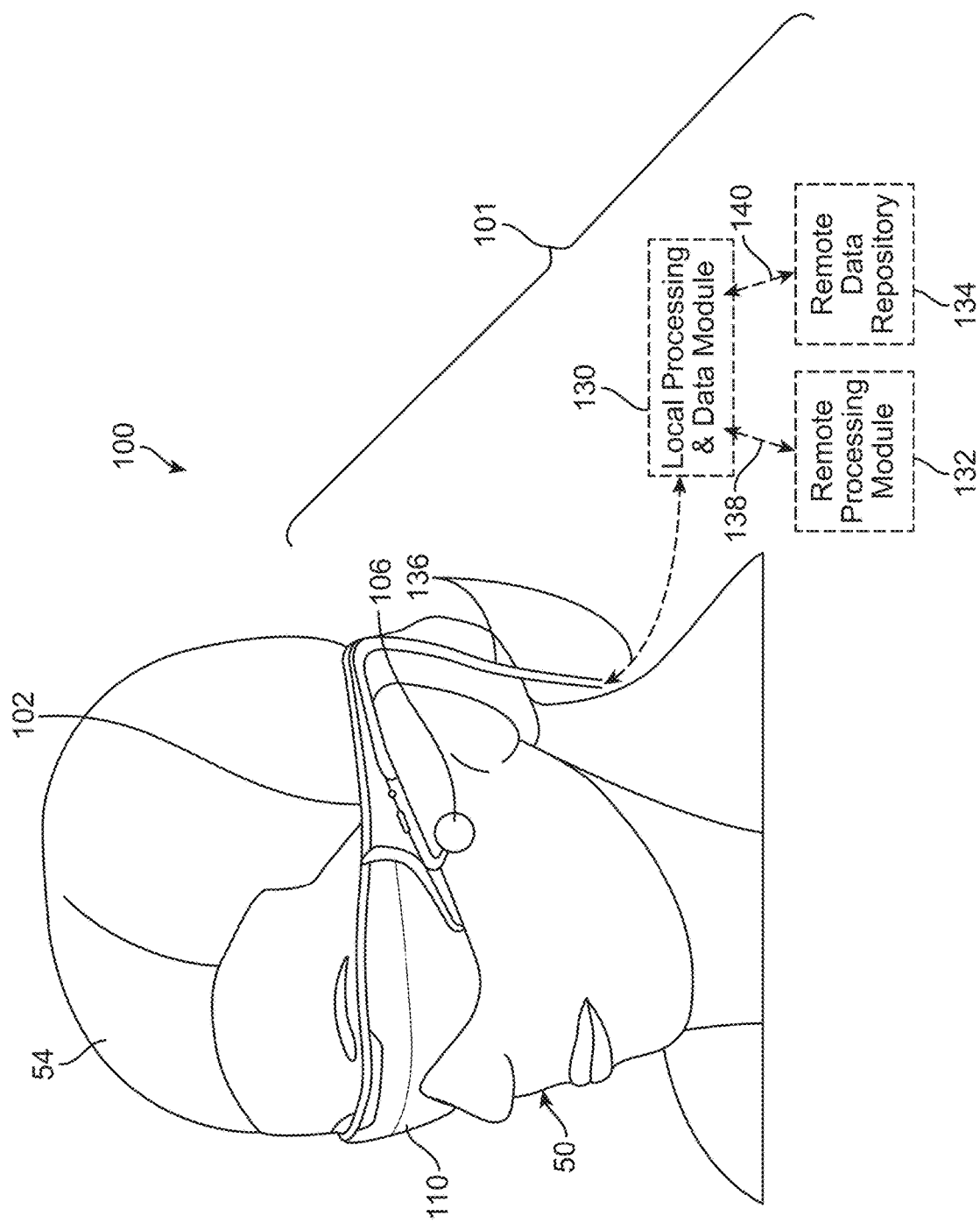
FIG. 1 illustrates another image display system having an image display device in accordance with some embodiments.
Figure 2:
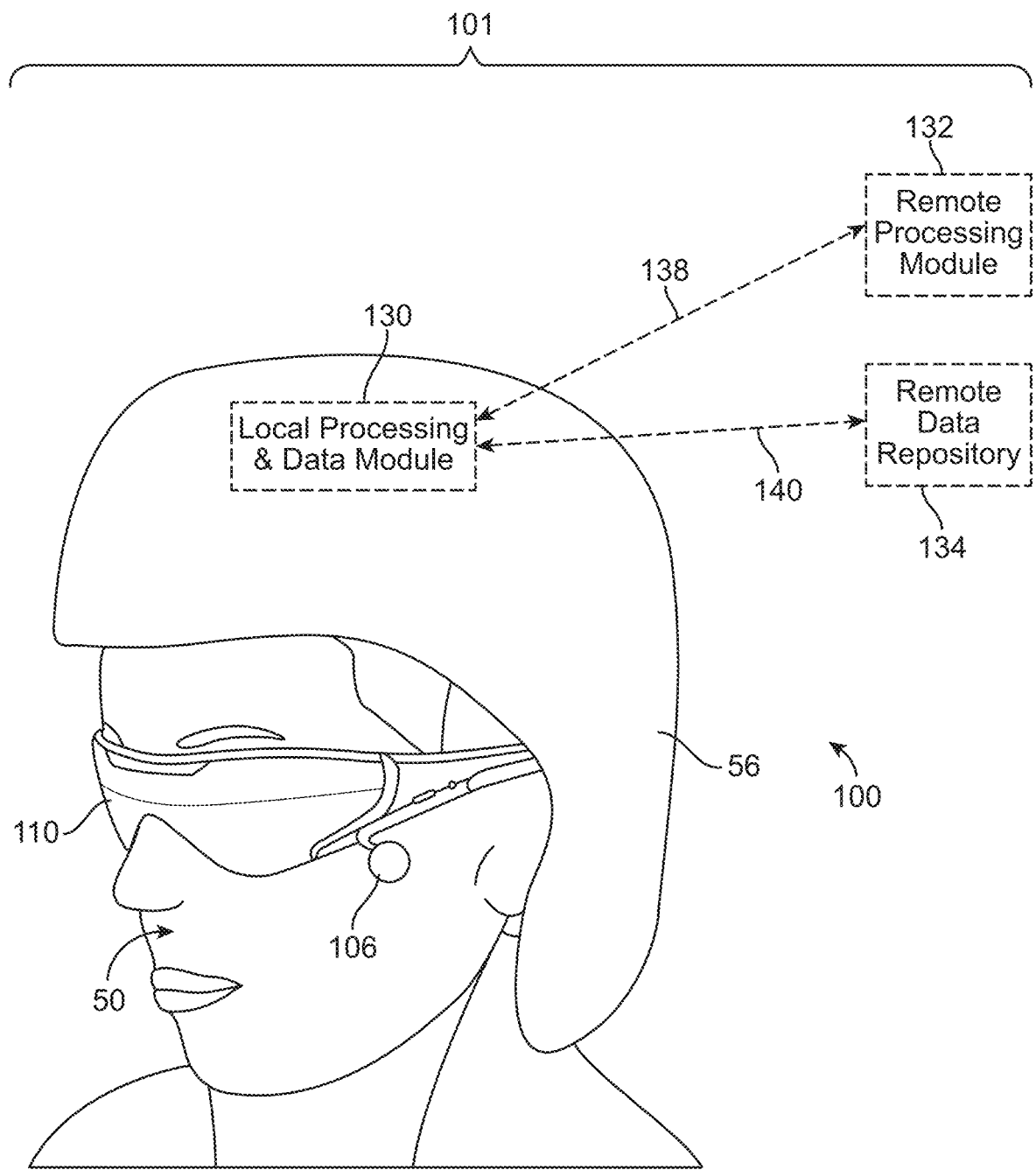
FIG. 2 illustrates another image display system having an image display device in accordance with other embodiments.
Figure 3:
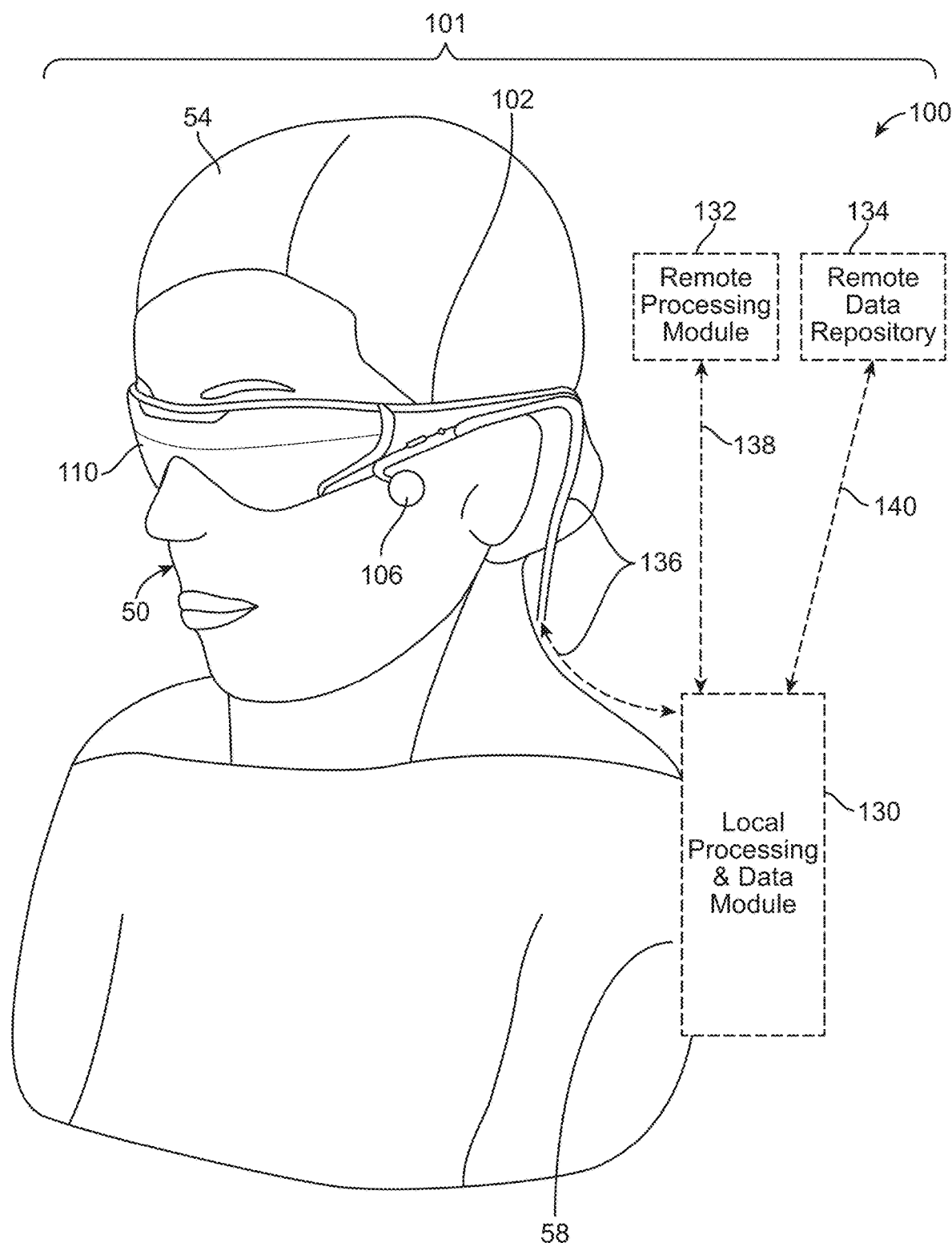
FIG. 3 illustrates another image display system having an image display device in accordance with other embodiments.

Various embodiments of the disclosure are directed to methods, apparatuses, and articles of manufacture for providing input for head-worn video image devices. Other objects, features, and advantages of the disclosure are described in the detailed description, figures, and claims.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The description that follows pertains to an illustrative VR, AR, and/or MR system with which embodiments described herein may be practiced. However, it is to be understood that the embodiments also lends themselves to applications in other types of display systems (including other types of VR, AR, and/or MR systems), and therefore the embodiments are not to be limited to only the illustrative examples disclosed herein.

Summary of Problems and Solutions

In some cases, in order to localize a user of a head-worn image display device with respect to the user's environment, a localization map of the environment is obtained. Then real-time input image from the camera system of the image display device is then matched against the localization map to localize the user. For example corner features of the input image may be detected from the input image, and match against corner features of the localization map. In some embodiments, in order to obtain a set of corners as features from an image for use in localization, the image may first need to go through corner detection to obtain an initial set of detected corners. The initial set of detected corners is then further processed, e.g., go through non-maxima suppression, spatial binning, etc., in order to obtain a final set of detected corners for localization purposes. In some cases, filtering may be performed to identify a subset of detected corners in the initial set to obtain the final set of corners. However, in low light situations, the number of corners in the final set of detected corners may be too low. This is because the criterion for filtering the initial set of detected corners, while may work for normal light situations, may not work for low light situations. As a result, the low number of detected corners may be insufficient for localization purposes, or may result in localization errors. Accordingly, it would be advantageous to have a novel method and apparatus to obtain a set of corners for localization purposes. Such method and apparatus would produce a set of corners with sufficient number of corners for localization purposes, for both normal light and low light situations.

FIGS. 1-4 illustrate various components of an image display system 100 in various embodiments. The image display system 100 includes an image display device 101, and an apparatus 200 for providing input for the image display device 101. The apparatus 200 will be described in further detail below. The image display device 101 may be a VR device, an AR device, a MR device, or any of other types of display devices. The image display device 101 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 comprises a partially transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The image display device 101 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros), or any combination of the foregoing. Many of these sensors operate on the assumption that the frame 102 on which they are affixed is in turn substantially fixed to the user's head, eyes, and ears.

The image display device 101 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The image display device 101 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of the image display device 101 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem 110.

Figure 4:
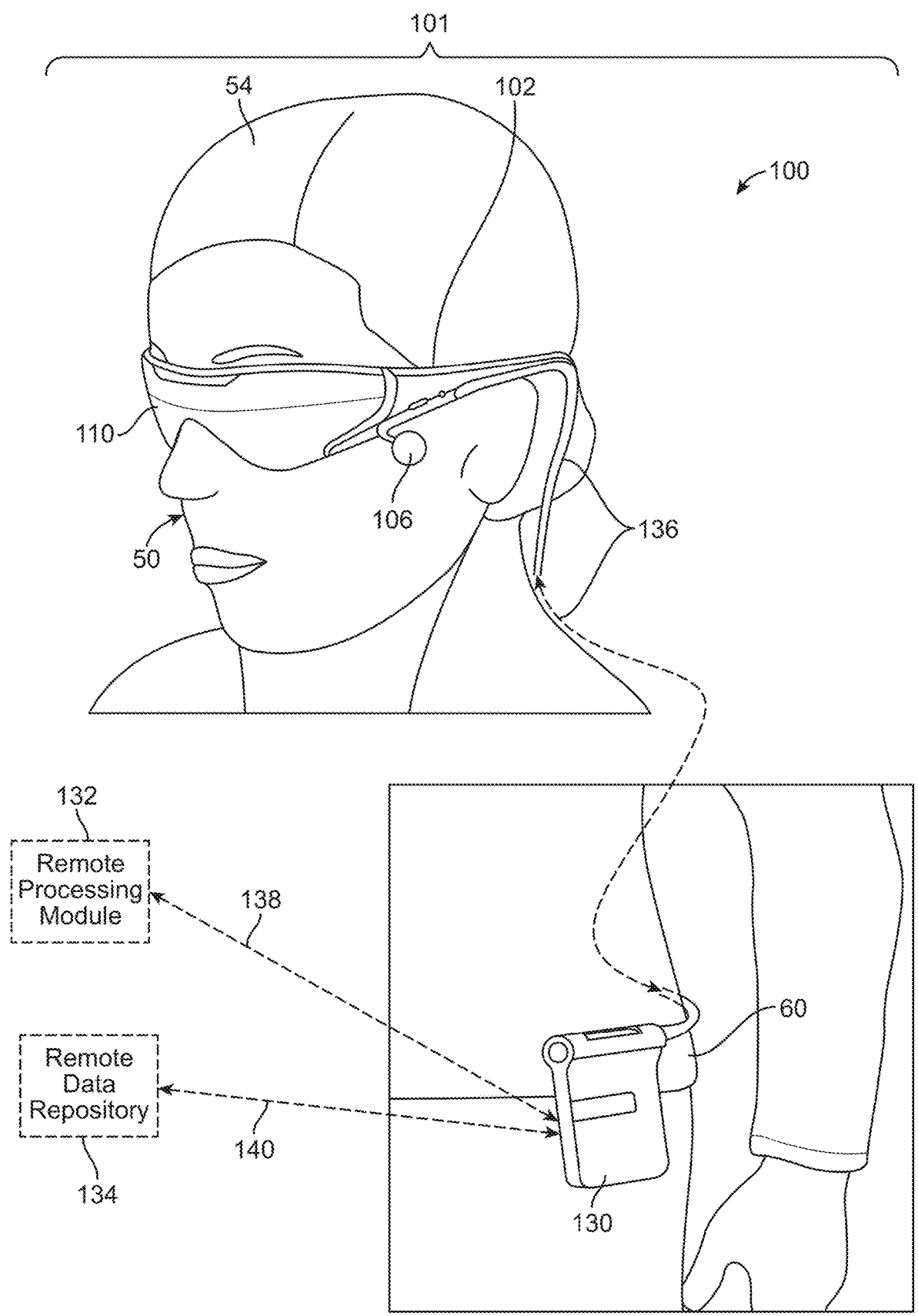
FIG. 4 illustrates another image display system having an image display device in accordance with other embodiments.

The various processing components of the image display device 101 may be physically contained in a distributed subsystem. For example, as illustrated in FIGS. 1-4, the image display device 101 may include a local processing and data module 130 operatively coupled, such as by a wired lead or wireless connectivity 136, to the display subsystem 110 and sensors. The local processing and data module 130 may be mounted in a variety of configurations, such as fixedly attached to the frame structure 102 (FIG. 1), fixedly attached to a helmet or hat 56 (FIG. 2), removably attached to the torso 58 of the end user 50 (FIG. 3), or removably attached to the hip 60 of the end user 50 in a belt-coupling style configuration (FIG. 4). The image display device 101 may also include a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In some embodiments, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 1-4. Thus, the particular choice of wired or wireless communications should not be considered limiting.

In some embodiments, the user orientation module is contained in the local processing and data module 130, while CPU and GPU are contained in the remote processing module. In alternative embodiments, the CPU, GPU, or portions thereof may be contained in the local processing and data module 130. The 3D database can be associated with the remote data repository 134 or disposed locally.

Some image display systems (e.g., VR system, AR system, MR system, etc.) use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the image display system 100 (e.g., VR system, AR system, MR system, etc.) projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 5:
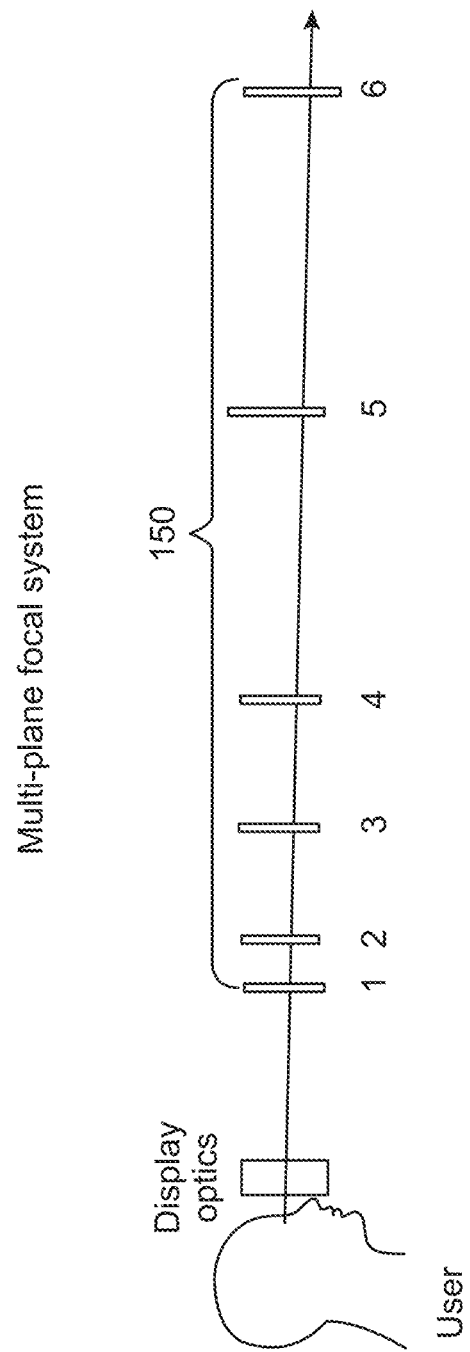
FIG. 5 illustrates an image display device displaying frames in multiple depth planes.

Multiple-plane focus systems create a perception of variable depth by projecting images on some or all of a plurality of depth planes located at respective fixed distances in the Z direction from the user's eye. Referring now to FIG. 5, it should be appreciated that multiple-plane focus systems may display frames at fixed depth planes 150 (e.g., the six depth planes 150 shown in FIG. 5). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 5. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the image display system 100 (e.g., VR system, AR system, MR system, etc.) may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 5) may be utilized. Then an image of a closer tree branch may be injected at time 2 and an LOE configured to create an image appearing to originate from a depth plane 10 meters away (e.g., depth plane 5 from FIG. 5) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

The image display system 100 may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Localization Map

Figure 6:
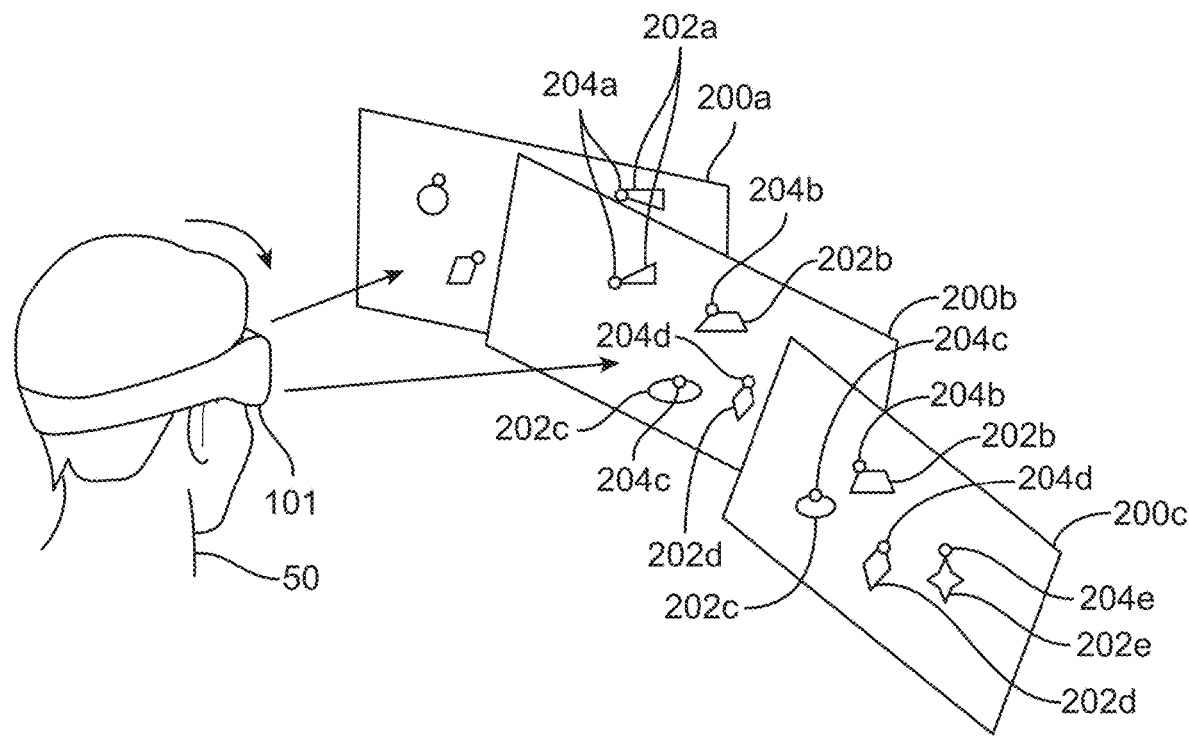
FIG. 6 illustrates a method for determining a map for allowing an image display device to localize a user of the image display device, and/or to perform other function(s).

FIG. 6 illustrates a method for determining a map for allowing the image display device 101 to localize the user 50 of the image display device 101. As shown in the figure, when the user 50 is using the image display device 101, the user 50 can move the image display device 101 to achieve different viewing locations and/or directions. For example, the user 50 may turn his/her head, turn his/her body, and/or walk to different locations. In some embodiments, the image display device 101 includes a forward facing camera. Thus, by moving the image display device 101, the field of view of the forward facing camera of the image display device 101 will change accordingly. While the user 50 is at different poses, the camera of the image display device 101 generates corresponding images. In the illustrated example, the user 50 achieves three different poses by turning his/her head, and the forward facing camera of the image display device 101 generates three images 200a-200c that correspond with the three poses. Each of the images 200a-200c captures certain objects 202 in the environment. For example, image 200b captures objects 202a-202d, and image 200c captures objects 202b-202e. Depending on the poses achieved by the user 50, a certain object in the environment may be captured in multiple images 202 of the camera, and certain other object may be captured in only one image 200. In some embodiments, the processing unit 130 of the image display device 101 is configured to obtain the images 200 from the camera of the image display device 101, and perform image processing to extract features (e.g., corners, edges, user-defined features, etc.) from the images 200 to create a map 220. The map 200 may be stored in a non-transitory medium of the image display device 101, and may be used by the processing unit 130 to perform localization of the user 50. Thus, the map 220 functions as a localization map. In the illustrated embodiments, the map 220 is a three dimensional representation of the environment detected by the different poses of the user 50.

Figure 7:
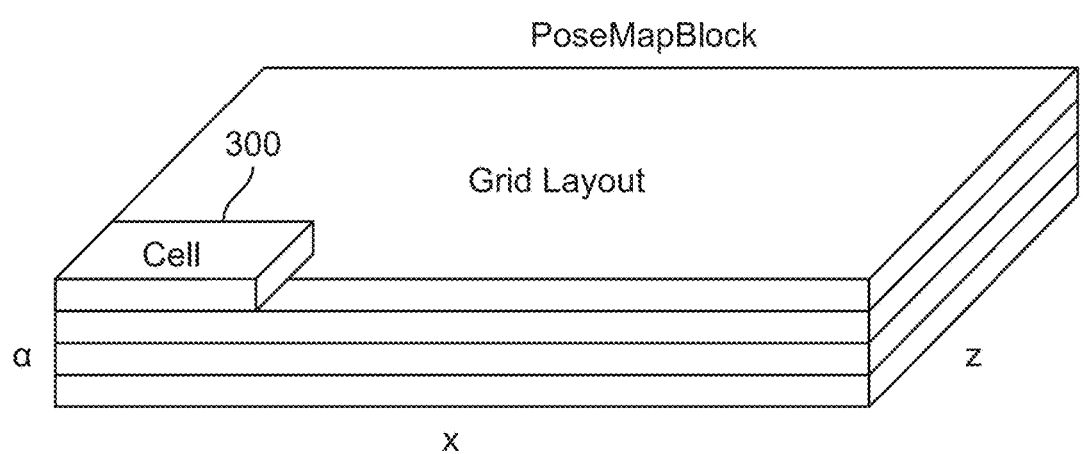
FIG. 7 illustrates an example of an environment being divided into multiple cells.

In some embodiments, the environment surrounding the user 50 may be divided into multiple cells. In such cases, the above map creation technique may be employed for the different cells of the environment. FIG. 7 illustrates an example of an environment being divided into multiple cells 300. Each cell 300 is a defined three-dimensional space representing a portion of the environment. Each cell 300 may have a pre-determined size and shape. For example, each cell 300 may have a footprint area that is 2 m×2 m, and a height that is 2 m. Each cell 300 may have other footprint dimensions and/or other heights in other embodiments. Also, in other embodiments, each cell 300 may not have a rectangular configuration shown, and may have other shapes. In the illustrated embodiments, the cells 300 all have the same shape and dimensions. In other embodiments, at least two of the cells 300 may have different respective dimensions and/or shapes.

In some embodiments, the user 50 of the image display device 101 may go to different locations in the environment corresponding to the different cells 300, and may scan the spaces in the corresponding cells using the camera of the image display device 101 to obtain different maps for the respective cells of the environment. The maps may be stored in the non-transitory medium of the image display device 101 for allowing the processing unit 130 of the image display device 101 to perform localization of the user 50.

During use of a map to localize the user 50, the camera of the image display device 101 obtains an image of the environment based on a certain position and orientation of the user 50. Such camera image serves as a tracking image (tracking map) for allowing the processing unit 130 of the image display device 101 to track a position of the user 50. In particular, the processing unit 130 of the image display device 101 processes the image from the camera to determine if features (e.g., corners, edges, user-defined features, etc.) in the image match with certain features in the map 220. If a match is found, the processing unit 130 may then determine the position and orientation of the user 50 based on the matched features. In some embodiments, the map 220 may contain less information (e.g., features) than the tracking image provided by the camera of the image display device 101. This is advantageous because it allows the processing unit 130 to efficiently match the tracking image with the map 220. Also, in some embodiments, the map 220 may be called a "canonical map". When performing localization, the processing unit 130 performs features extraction to extra features from camera image (tracking image), and matches the features with those in the canonical map. In one implementation, the processing unit 130 is configured to find a six degree of freedom transformation between the tracking image and the canonical map to localize the user 50. Once the user 50 can be successfully localize with respect to his/her environment using the map, the processing unit 130 may then allow the user to place virtual content with respect to the environment using the map, retrieve the virtual content from previous session, share the virtual content with other user(s), etc.

During use of the image display device 101, the processing unit 130 may need to perform corner detection in images provided by the camera system of the image display device 101. For example, in some embodiments, when determining the map 220 using camera images, the processing unit 130 may detect corners in these images. The detected corners may be utilized by the processing unit 130 as features to construct the map 220. Alternatively, or additionally, when determining the map 220, the processing unit 130 may detect other feature(s), such as edge(s) or user-defined feature(s). Also, when performing localization using the map 220, the processing unit 130 may need to match features in a real-time input image with features of the map 220. Accordingly, the processing unit 130 may be configured to detect features, such as corners, edges, user-defined features, etc., in real-time input images. Corners are generally more stable features in the sense that corners are generally detectable from different viewing direction. Accordingly, the detectability of corners in images may not be significantly affected by change in view point. Therefore, corners are good features to match between input images and the map 220. Corners are also good features to use in stereo matching between images generated at different times and at different viewing directions.

Feature Detection

Figure 8:
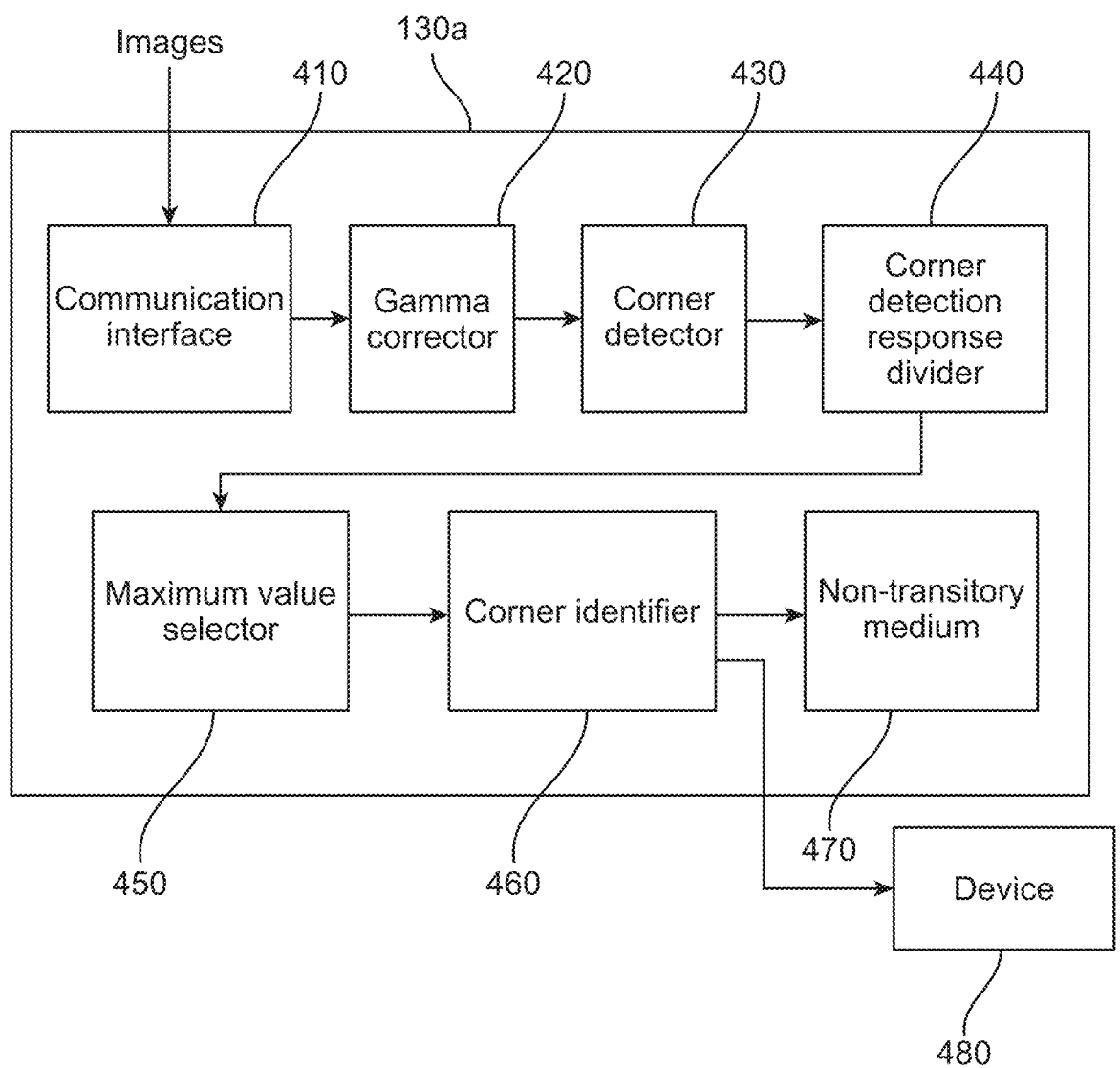
FIG. 8 illustrates a processing unit of an image display device.

FIG. 8 illustrates a processing unit 130a, according to some embodiments. As shown in the figure, the processing unit 130a includes a communication interface 410, a gamma corrector 420, a corner detector 430, a corner detection response divider 440, a maximum value selector 450, a corner identifier 460, and a non-transitory medium 470. In some embodiments, the communication interface 410, the gamma corrector 420, the corner detector 430, the corner detection response divider 440, the maximum value selector 450, the corner identifier 460, or any combination of the foregoing, may be implemented using hardware. By means of non-limiting examples, the hardware may include one or more FPGA processors, one or more ASIC processors, one or more signal processors, one or more math processors, one or more processors specifically designed to perform matrix operations, one or more integrated circuits, or any combination of the foregoing. In some embodiments, the communication interface 410, the gamma corrector 420, the corner detector 430, the corner detection response divider 440, the maximum value selector 450, the corner identifier 460, or any combination of the foregoing, may be implemented using software or using a combination of hardware and software.

In some embodiments, the processing unit 130a may be implemented as separate components that are communicatively coupled together. For example, the processing unit 130a may have a first substrate carrying the communication interface 410, the gamma corrector 420, and the corner detector 430, and another substrate carrying the corner detection response divider 440, the maximum value selector 450, and the corner identifier 460. As another example, all of the components of the processing unit 130a may be carried by a same substrate. In some embodiments, any, some, or all of the components of the processing unit 130a may be implemented at the head-worn frame structure 102. In some embodiments, any, some, or all of the components of the processing unit 130a may be implemented at a device that is away from the head-worn frame structure 102, such as at a belt-clip module, a neck-worn module, a cell phone, etc.

The communication interface 410 is configured to receive images. In some embodiments, the communication interface 410 is communicatively coupled to a camera of the image display device 101. In such embodiments, the communication interface 410 receives images directly from the camera. In some embodiments, the communication interface 410 may be coupled to another device, such as another processing unit, which processes images from a camera before passing the images to the communication interface 410.

The gamma corrector 420 is configured to adjust a non-linear relationship between pixel value and luminance. In some embodiments, the gamma corrector 420 may be configured to adjust a relationship between a pixel value and luminance in an image so that their relationship is linear, or more linear compared to that in the original (raw) image. In some embodiments, the gamma corrector 420 may be optional, and the processing unit 130a may not include the gamma corrector 420.

The corner detector 430 is configured to detect corner(s) in an image based on one or more criteria. In some embodiments, the corner detector 430 is configured to detect corners in an image using Harris corner detection technique. Harris corner detection is achieved by calculating each pixel's gradient. If the absolute gradient values are both great (e.g., above a certain threshold(s)) in two directions (e.g., orthogonal directions), then the corner detector 430 may determine the pixel as a corner. In one implementation of the Harris corner detection technique, the following algorithm is employed to calculate a score for each pixel in an image:

(1) Compute x and y derivatives of image $$I_x = G_\sigma^x * I \quad I_y = G_\sigma^y * I$$

where $G^x$ and $G^y$ are the first-order directional differentials. In some cases, $G^x$ and $G^y$ may be calculated by convolving gray values and difference operators in direction x, y.

(2) Compute products of derivatives at every pixel $$I_{x2} = I_x \cdot I_x, I_{y2} = I_y \cdot I_y, I_{xy} = I_x \cdot I_y$$

(3) Compute the sums of the products of derivatives at each pixel $$S_{x2} = G_{\sigma 1} * I_{x2}, S_{y2} = G_{\sigma 1} * I_{y2}, S_{xy} = G_{\sigma 1} * I_{xy}$$

(4) Define at each pixel (x, y) the matrix $$H(x, y) = \begin{bmatrix} S_{x2}(x, y) & S_{xy}(x, y) \\ S_{xy}(x, y) & S_{y2}(x, y) \end{bmatrix}$$

Alternatively, the matrix H may be represented as:

$$\begin{bmatrix} I_x^2 & I_x I_y \\ I_x I_y & I_y^2 \end{bmatrix}$$

where $(I_x, I_y)$ is the gradient at (x, y).

(5) Compute the score (Harris response) for each pixel $$R = \text{Det}(H) - k(\text{Trace}(H))^2$$

where Det $(H) = \lambda_1 \lambda_2$, Trace $(H) = \lambda_1 + \lambda_2$, and $\lambda_1$ and $\lambda_2$ are eigenvalues of H.

Figure 9A:
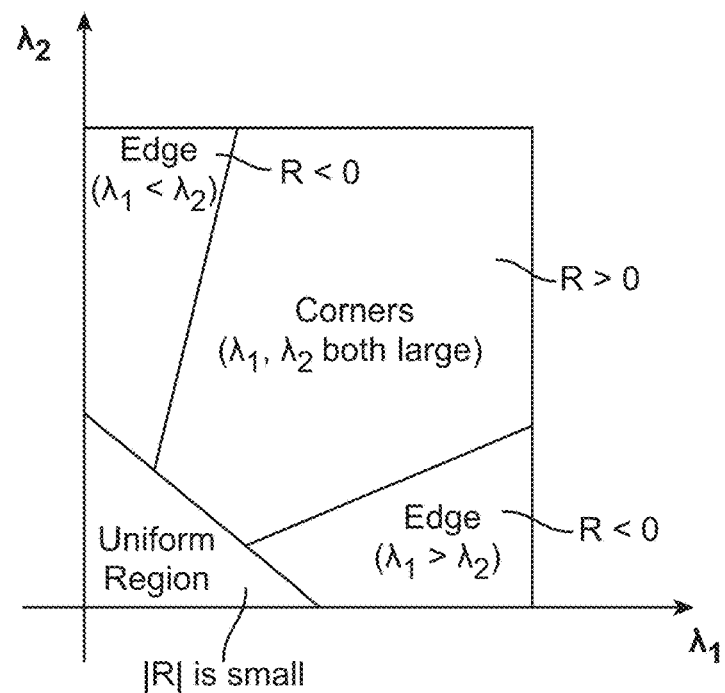
FIGS. 9A-9B illustrate classifications of image points using eigenvalues and/or Harris score.
Figure 9B:
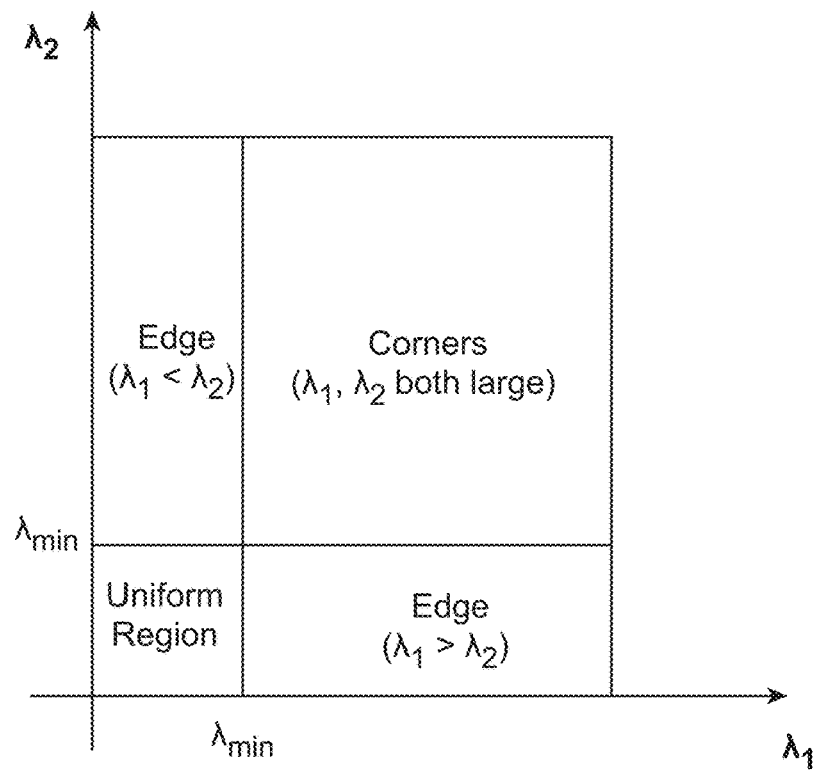

In some embodiments, the Harris response R and/or the eigenvalues $\lambda_1, \lambda_2$ may be used by the corner detector 430 in one or more criteria for corner detection. FIG. 9A shows classification of image points using response R and/or eigenvalues according to Harris scoring function. In some embodiments, Shi-Thomasi criteria may be used for corner detection. FIG. 9B shows classification of image points using eigenvalues according to Shi-Tomasi criteria. As shown in FIGS. 9A-9B, if both eigenvalues $\lambda_1, \lambda_2$ are small, then the pixel may be a part of a flat region. Accordingly, the corner detector 430 may be configured to detect corner based at least in part on a criterion that min $(\lambda_1, \lambda_2)$>threshold. As another example, as shown in FIGS. 9A-9B, if the larger eigenvalue $\lambda_2$ is larger than the smaller eigenvalue $\lambda_1$ by a threshold, then the pixel may be a part of an object with a linear configuration (e.g., a line, edge, etc.). Accordingly, the corner detector 420 may be configured to detect corners based at least in part on a criterion that $\lambda_2/\lambda_1$<threshold. In some embodiments, the corner detector 430 may be configured to detect corners based on both criteria:

$$\min(\lambda_1, \lambda_2) > \text{threshold } T1 \quad (1)$$

$$\lambda_2/\lambda_1 < \text{threshold } T2 \quad (2)$$

In some embodiments, the threshold T1 may be set to be 300. In other embodiments, the threshold T1 may have other values different from 300. In some embodiments, the threshold T2 may be set to be 5. In other embodiments, the threshold T2 may have other values different from 5. The threshold T1 and the threshold T2 may be set to any values, depending on the particular application.

In some embodiments, the above two criteria may be expressed in terms of Det (H) and Trace (H), as follow:

$$\text{Trace}(H) > 2T1, \text{ and } \text{Det}(H) - T1 * \text{Trace}(H) + T1A2 >$$

$$\text{Det}(H) - T2/((1+T2)^2) * \text{Trace}(H)^2 > 0$$

In such cases, the corner detector 430 may be configured to use two Harris responses of different k (k1, k2) to calculate Det and Trace, as follow:

Harris response based on $k1>0$ where $k1 = T2/((1+T2)^2) = 0.139$ when $T2 = 5$ (1)

Trace^2 = (Harris response based on k2 − Harris response based on k1)/(k1 − k2) > 4T1^2 (2)

In some embodiments, k2 may be selected in a manner that would simplify calculation. For example, the above equation (2) may be rewritten as:

(Harris response based on k2 − Harris response based on k1) > (4T1^2) * (k1 − k2) (2)

In such cases, k2 may be selected so that the term on the right side ((4T1^2)*(k1−k2)) becomes 1, and the evaluation may be simplified based on the expression on the left side being greater than 1. In some embodiments, k2 may be calculated based on the formula:

$$K2 = (k1 - 1/16)/16$$

Accordingly, if k1 is set to be 0.139, k2 is then equal to 0.00478125 based on the above equation.

In should be noted that k1 and k2 are not limited to have the above values, and may have other values in other embodiments. For example, in some embodiments, k1 may have a value that is anywhere from 0.1 to 0.2. Also, for example, in some embodiments, k2 may have a value that is less than 0.001. The values k1, k2 may have any values, depending on the particular application.

In addition, it should be noted that as used in this specification, the term "corner" is not limited to a point of intersection between two rectilinear lines, and may also refer to any point along a curve line that connects two lines (e.g., rectilinear lines), wherein the curve line may have a radius of curvature (such that, the smaller the radius of curvature, the sharper the "corner").

Also, it should be noted that the corner detector 430 is not limited to detecting corners based on the above formulas and examples of values, and that the corner detector 430 may be configured to detect corners based on other formulas that may be derivation, variation, and/or modification of the above formulas. In addition, in some embodiments, the corner detector 430 may be configured to detect corners based on other corner detection techniques that are different from Harris corner detection technique. One or more embodiments described herein are not limited to any particular corner detection technique, and any corner detection technique may be used in any embodiments described herein. For example, instead of using a Harris corner detection algorithm, the corner detector 430 may be configured to perform corner detection based on a Scale-Invariant Feature Transform (SIFT) algorithm, a Features from Accelerated Segment Test (FAST) algorithm, a Shi-Thomasi algorithm, or any other type of corner detection algorithm.

Returning to FIG. 8, the corner detection response divider 440 is configured to divide a corner detection response from the corner detector 430 into patches. In the illustrated embodiments, a corner detection response from the corner detector 430 may include one or more response values arranged in rows and columns that correspond with an image. For example, each response value in the corner detection response may correspond to a pixel, or several pixels in a small area, in an image. In some cases, the corner detection response may have C number of columns of response values, and R number of rows of response values, so that it forms a table or a matrix with a size of the C×Y. The corner detection response divider 440 is configured to divide the corner detection response into a number of patches, with each patch having a size of CP×YP, wherein CP is a fraction of C, and YP is a fraction of Y. For example, in some embodiments, a corner detection response may have 640×480 response values (pixels). In such cases, the corner detection response divider 440 may divide the corner detection response into a number of patches, with each patch having 16×12 response values (pixels).

The maximum value selector 450 is configured to determine a maximum value associated with a patch (a subset of the corner detection response). In some embodiments, the maximum value may be a maximum response value in a patch. In such cases, the maximum value selector 450 is configured to determine (e.g., select) the maximum response value from among the one or more response values in each of the patches (i.e., a subset of the corner detection response). In other embodiments, the response values may be modified (e.g., scaled, shifted, filtered, etc., or a combination of the foregoing), and the maximum value may be a maximum of the modified response values in a patch. It should be noted that the term "select" and any or other similar terms (such as "selector") are not limited to the act or function of selecting, and may include determining, or any of other ways or techniques of obtaining. Thus, the term "maximum value selector" is not limited to a module that "selects" and may include a module that performs any of other functions (e.g., calculating, determining, performing MAX function, etc., or any combination of the foregoing) to obtain a maximum value.

The corner identifier 460 is configured to identify one or more corners in each patch based on one or more criteria. In some embodiments, the corner identifier 460 is configured to identify a first set of one or more corners for a first region of the image based on a first criterion that relates to the determined maximum value associated with a patch of the corner detection response (e.g., a first maximum value in a first patch of the corner detection response). In some embodiments, the corner identifier 460 is configured to obtain a relative factor, and multiply the maximum value of the first patch by the relative factor to obtain a first threshold value. The corner identifier 460 is also configured to obtain a second threshold value, the second threshold value being an absolute threshold. The corner identifier 460 then determines a criterion value for a criterion that is the larger of the first threshold value and the second threshold value. The corner identifier 460 also identifies response value(s) in the first patch of the corner detection response that is larger than the criterion value to identify the first set of corner(s).

In some embodiments, the corner identifier 460 is also configured to identify one or more corners in the first set also based on a condition that relates to non-maxima suppression. For example, a mask size for the non-maxima suppression may be 3×3. The non-maxima suppression is for eliminating duplicate detected corners within a moving mask having the mask size, so that duplicate detection of the same corner is prevented. In some cases, due to the image resolution of the image and/or the manner in which corner detection is implemented, the same corner may be detected multiple times. For example, the corner detector 430 may detect the same corner three times at three locations that are close to each other, when in fact those three detected corners are all for the same corner in the image. Thus, as used in this specification, the term "corner" may refer to one corner, or instance(s) of a corner that is detected multiple times. In some embodiments, assuming a 3×3 non-maxima suppression mask is used, if there are multiple corners detected within a 3×3 pixel region, the non-maxima suppression will result in one of the multiple detected corners in this region being selected as the detected corner.

In some embodiments, the corner identifier 460 is configured to determine a pixel in the first region of the first image as a corner (1) if a response value in the corner detection response for the pixel is larger than a criterion value obtained based on the first maximum value, and (2) if the response value for the pixel is larger than all surrounding values in a mask (a non-maxima suppression mask) with a certain mask size.

In the illustrated embodiments, the above processing may be repeated for additional patches of the corner detection response corresponding to other regions of the image. In particular, the processing unit 130a is also configured to determine a second maximum value in a second subset of the corner detection response for a second patch in the one or more patches. The corner identifier 460 then identifies a second set of one or more corners in a second region of the first image based on a second criterion that relates to the second maximum value.

The identified corner(s) in each patch may be stored in a non-transitory medium 470, and/or may be passed to a device 480 for further processing. In the illustrated embodiments, the non-transitory medium 470 is illustrated as being a part of the processing unit 130*a*. In some embodiments, the non-transitory medium 470 may be outside the processing unit 130*a*. In such cases, the processing unit 130*a* is configured to communicate with the non-transitory medium 470, and transmit information (such as identified corners) to the non-transitory medium 470. The device 480 may be any device outside the processing unit 130*a*, and may or may not be a part of the image display device 101. For examples, the device 480 may be another processing unit in the image display device 101, or may be a processing unit outside the image display device 101. In some examples, the device 480 may be a storage device in the image display device 101, or may be a storage device outside the image display device 101. As further examples, the device 480 may be a communication device in the image display device 101. In such cases, the device 480 is configured to receive information from the processing unit 130*a*, and wirelessly transmit the information to an external device outside the image display device 101. In some embodiments, the device 480 may be a screen of the image display device 101. In such cases, the processing unit 130*a* is configured to operate the screen to display graphics representing the identified corner(s).

In some embodiments, the detection of corners by the corner detector 430 and the identification of corners by the corner identifier 460 may be performed by the processing unit 130*a* to process real-time input images from the camera system of the image display device 101. For example, input image may be provided by the camera system, and the processing unit 130*a* determines a set of corners from the input image. The set of corners may be utilized as a set of features for the input image for matching with corresponding features with localization map in order to localize the user of the image display device 101.

In some embodiments, the detection of corners by the corner detector 430 and the identification of corners by the corner identifier 460 may be performed by the processing unit 130*a* to process images from the camera system of the image display device 101 in order to create a localization map. For example, the processing unit 130*a* may obtain a sequence of images from the camera system of the image display device 101, and may determine a set of corners from each of the images in the sequence. The images may be obtained by the camera system when the user of the image display device 101 is performing different head poses so that the images correspond with different viewing directions of the user. The processing unit 130*a* may also perform stereo matching in which it matches a corner in one image in the sequence with a corner in another image in the sequence, in order to create a 3D map point for that corner. The 3D map point is then included as a part of the localization map.

Figure 10:
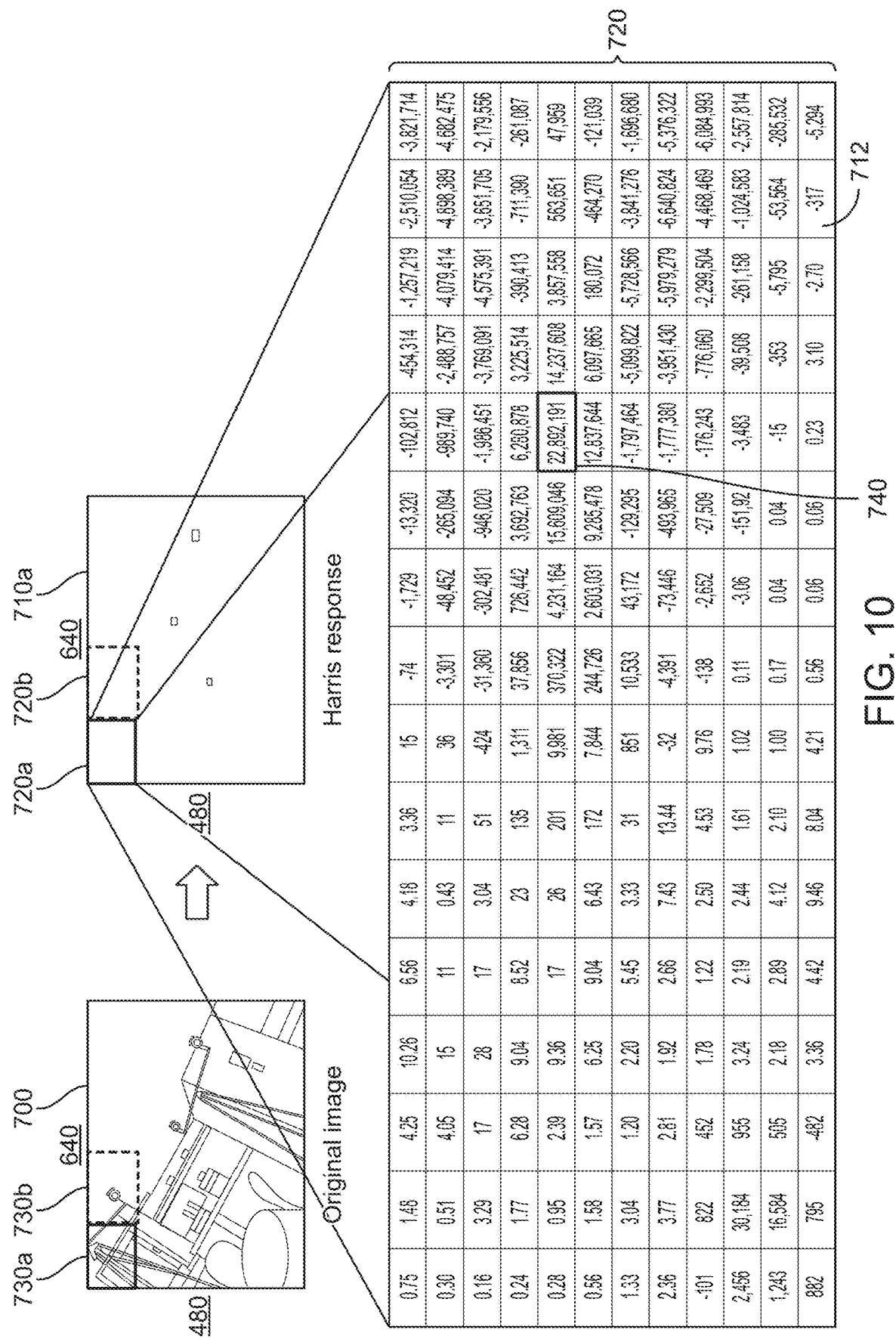
Figure 12:
FIG. 12 illustrates exemplary results of output by the processing unit of FIG. 8, particularly showing the results including identified corners in an image.

FIGS. 10-12 illustrate a method performed by the processing unit 130*a* of FIG. 8. As shown in FIG. 10, an image 700 is obtained by the processing unit 130*a*. In some embodiments, the obtaining of the image 700 may be performed by the communication interface 410. The processing unit 130*a* then performs gamma correction and corner detection to detect corners in the image. In some embodiments, the gamma corrector 420 performs the gamma correction, and the corner detector 430 performs the corner detection. As a result of the corner detection, a corner detection response 710*a* is provided by the corner detector 430. In the illustrated example, the corner detection response 710*a* includes 640×480 pixels, with each pixel having a response value. In some embodiments, the corner detection response 710*a* may have other sizes that are different from 640×480 pixels.

Next, the corner detection response divider 440 divides the corner detection response 710*a* into one or more patches 720. In the illustrated example, each patch 720 includes 16×12 pixels, with each pixel in the patch 720 having a response value 712. In some embodiments, each patch 720 may have other sizes that are different from 16×12 pixels. In some embodiments, all of the patches 720 divided from the corner detection response 710*a* have the same size. In some embodiments, two or more of the patches 720 may have respective sizes that are different from each other. As shown in the figure, the one or more patches 720 include at least a first patch (represented by a solid rectangular box) and a second patch (represented by a dashed rectangular box). The patches 720 divided from the corner detection response 710*a* correspond with respective regions 730 in the image 700. For example, a first patch 720*a* (represented by the solid rectangular box) of the corner detection response 710*a* includes response values 712 for the first region 730*a* (represented by a solid rectangular box) of the image 700, and a second patch 720*b* (represented by the dashed rectangular box) of the corner detection response 710*a* includes response values 712 for the second region 730*b* (represented by a dashed rectangular box) of the image 700, etc.

Next, the maximum value selector 450 selects one of the response values 712 in the patch 720*a* that has the highest value. In some embodiments, the maximum value selector 450 may be configured to do the selection by performing a search function to identify one of the response values 712 in the patch 720 having the highest value. In other embodiments, the maximum value selector 450 may be configured to do the selection by performing a MAX operation to determine one of the response values 712 in the patch 720 having the highest value. In the illustrated example shown in FIG. 10, the maximum value selector 450 determines (e.g., selects) one of the pixels (response values) in the first patch 720*a* having a value of "22892191" as the first maximum value 740 in the first patch 720*a*.

Next, the corner identifier 460 identifies a first set of corner(s) for the first region 730*a* of the first image 700 based on a first criterion that relates to the determined first maximum value 740. In the illustrated embodiments, the corner identifier 460 is configured to obtain a relative factor, and multiply the maximum value 740 by the relative factor to obtain a first threshold value. For example, the relative factor may be 0.001. In such cases, following the above example in which the maximum value 740 in the first patch 720*a* is "22892191", the corner identifier 460 may multiply the maximum value 740 "22892191" by the relative factor of 0.001 to obtain 22892.191 as the first threshold value.

The corner identifier 460 is also configured to obtain a second threshold value, the second threshold value being an absolute threshold. For example, the second threshold value may be 10. The corner identifier 460 then determines a criterion value for a first criterion as the larger of the first threshold value and the second threshold value. Following the example, the corner identifier 460 determines the criterion value for the first criterion as max (22892.191, 10)=22892.191. The corner identifier 460 may then identify response value(s) 712 in the first patch 720*a* of the corner detection response 710*a* that is larger than the criterion value (22892.191 in the example) to identify a first set of corner(s) for the first region 730*a* of the image 700.

As shown in the above example, the corner identifier 460 may identify a pixel with a certain response value as a corner if a first condition is met: Response value>Max (first threshold, second threshold), wherein first threshold=maximum response value in patch×relative factor.

In some embodiments, the corner identifier 460 is also configured to identify corner(s) in the first patch 720a if a second condition based on non-maxima suppression is met. The non-maxima suppression is for eliminating duplicate detected corners within a moving mask having the mask size, so that duplicate detection of the same corner is prevented. For example, if the mask size for the non-maxima suppression is 3×3, then the corner identifier 460 may identify a pixel with a certain response value as a corner if the condition is met: Response value>all its surrounding values in the 3×3 mask.

The above technique is illustrated in the example of FIG. 11. As shown in the figure, a non-maxima suppression mask 750 with a size of 3×3 is moved across all the different response values in the first patch 720a of the corner detection response 710a to identify response value(s) that are larger than all surrounding values in the 3×3 mask. The corner identifier 460 identifies response values as identified corners if both conditions are met:

(Condition 1): Response value>Max (first threshold, second threshold), wherein first threshold=maximum response value in patch×relative factor.
(Condition 2): Response value>all its surrounding values in the 3×3 mask.

In the illustrated example of FIG. 11, the corner identifier 640 identifies two response values 760 that satisfy both of the above conditions as a first set of identified corners for the first patch 720a and for the first region of the image 700.

The above processing may be repeated for all remaining patches 720 and for all remaining regions 730 of the image 700.

In some embodiments, after corners in an image are identified, the processing unit 130a is configured to create a map based at least in part on the identified corner(s), and to perform localization of the user based on the created map.

In some embodiments, the processing unit 130a is configured to operate the screen of the image display device 101 to display a graphic representing the identified corner(s).

In the above example, the relative factor is set as 0.001, and the second threshold (absolute threshold) is set as 10. In some embodiments, the relative factor may have other values. For example, in some embodiments, the relative factor may be more than 0.001 or less than 0.001 (e.g., 0.0005). In some embodiments, the second threshold may have other values. For example, in some embodiments, the second threshold may be more than 10 or less than 10. Also, in some embodiments, the second threshold (absolute threshold) may be less than 5, less than 3, less than 2, less than 1, less than 0.5, less than 0.1, less than 0.05, less than 0.03, or less than 0.02 (such as 0.01). In further embodiments, the second threshold (absolute threshold) may be anywhere from 0.005 to 0.015. In some embodiments, the relative factor and/or the second threshold may be adaptive parameters that are variable during use of the image display device 101. The number of patches 720 divided from the detection response 710a may be variable, depending on the particular application. In some cases, in a calibration process, the relative factor, the second threshold (absolute threshold), the number of patches 720, or any combination of the foregoing, may be adjusted until the processing unit 130a output a desired number of identified corners in a given lighting environment. The relative factor, the absolute threshold, and the number of patches are then stored as parameters for the given lighting environment. Then, during use of the image display device 101, if the user is in an environment with a lighting condition that matches with the given lighting environment utilized in the calibration process, the processing unit 130a may then use the stored parameters (for the relative factor, the absolute threshold, and number of patches) to identify corners in images. In some embodiments, the relative factor, the second threshold, the number of patches 720, or any combination of the foregoing, may be determined by the processing unit 130a during use of the image display device 101. For example, if the user is in an environment with low lighting, so that the number of corners for localization is below a certain minimum requirement, the processing unit 130a may then execute a calibration process to determine the appropriate relative factor, the second threshold, the number of patches 720, or any combination of the foregoing, for the particular environment.

The above technique for determining a set of corners in images for localization and/or tracking purposes is advantageous because it ensures that there is always sufficient number of corners for localization and or tracking, regardless of whether the environment has low lighting or not.

In some embodiments, positions of the response values in each patch 720 identified as corners may be utilized as, or to derive, positions of the respective corners in the image 700. For example, as shown in FIG. 11, the positions of the identified response values 760 may be the positions of the values in the patch 720—i.e., positions (3, 2) and (12, 8). In some embodiments, these values may be used as the positions of the identified corners. In some cases, positions of the detected corner(s) in each patch 720 may be transformed to a global coordinate system of the image 700. In particular, the corner positions in each patch 720 may initially be expressed in local coordinate system of the patch 720. The positions of the patches 720 with respect to the global coordinate system of the image 700 may be determined by the processing unit 130a. In some embodiments, the positions of the identified corners in each patch 720 may be transformed to the global coordinate system based on the known positions of the patches 720 with respect to the global coordinate system of the image 700.

FIG. 12 illustrates exemplary results of output by the processing unit 130a of FIG. 8, particularly showing the results including identified corners in an image.

Figure 13:
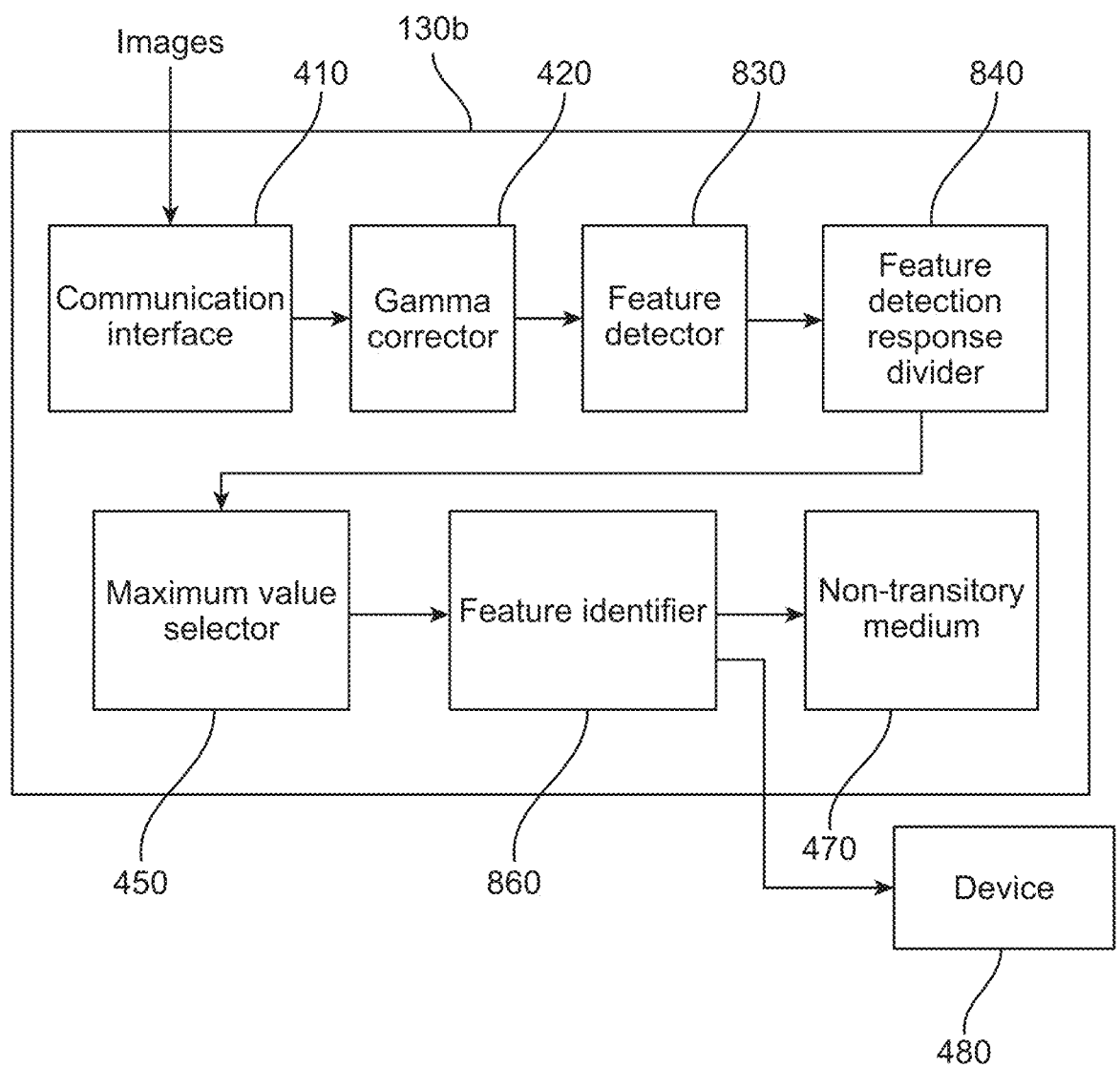
FIG. 13 illustrates another processing unit of an image display device.

In the above embodiments, the processing unit 130a is described as being configured to identify corners in images. However, the processing unit 130a and the method described herein should not be limited to identifying corners. The processing unit 130a may be configured to identify one or more features in images in different embodiments. FIG. 13 illustrates a processing unit 130b of an image display device. The processing unit 130b of FIG. 13 is the same as the processing unit 130a that is described with reference to FIG. 8, except that the processing unit 130b of FIG. 13 has a feature detector 830 (instead of the corner detector 430), a feature detection response divider 840 (instead of the corner detection response divider 440), and a feature identifier 860 (instead of the corner identifier 460). In some embodiments, the processing unit 130a of FIG. 8 may be considered as an example of the processing unit 130b of FIG. 13.

The processing performed by the feature detector 830 is the same as that described with reference to the corner detector 430, except that the feature detector 830 is configured to detect one or more features based on one or more feature detection techniques. The processing performed by the feature detection response divider 840 is the same as that described with reference to the corner detection response divider 440, except that the feature detection response divider 840 is configured to divide one or more feature detection responses (which may be any feature detection responses, such as edge detection response, and is not limited to corner detection response). In addition, the processing performed by the feature identifier 860 is the same as that described with reference to the corner identifier 460, except that the feature identifier 860 is configured to identify one or more features (such as corners, edges, user-defined features, etc.). In some embodiments, the feature identifier 460 may be a corner identifier configured to identify one or more corners. In some embodiments, the feature identifier 460 may be an edge identifier configured to identify one or more edges. In some embodiments, the feature identifier 460 may be configured to identify other items defined by a user.

In some embodiments, the feature detector 830 is configured to provide a feature detection response with one or more response values, wherein a high positive value indicates a detected first feature (e.g., corner), and a low negative value indicates a detected second feature (e.g., edge). In such cases, the maximum value selector 450 may be configured to identify a maximum positive value associated with (e.g., in) the feature detection response for identifying the first feature (e.g., corner identification), and/or may be configured to identify a maximum positive value associated with (e.g., in) a modified feature detection response (that is obtained by multiplying the initial feature detection response value by −1) for identifying the second feature (e.g., edge detection). Then the above technique for identifying corner(s) may be similarly performed by the processing unit 130b to identify edge(s) in the first region 730a of the image 700. In some embodiments, the processing unit 130b may further include a multiplier configured to multiply the response values 712 in the first patch 720a of the feature detection response 710b by −1 to obtain a modified first patch 722 (which will be explained in further detail below with reference to FIG. 14). The maximum value selector 450 then determines a first maximum value in the modified first patch 722 of the feature detection response 710b. The feature identifier 860 then identifies a first set of edge(s) for the first region 730a of the first image 700 based on a first criterion that relates to the first maximum value. It should be noted that, as used herein, the term "edge" is not limited to a full complete edge of an object, and may refer to an edgelet (a part of an edge), an outline of an object, or a part of an outline of an object.

Figure 14:
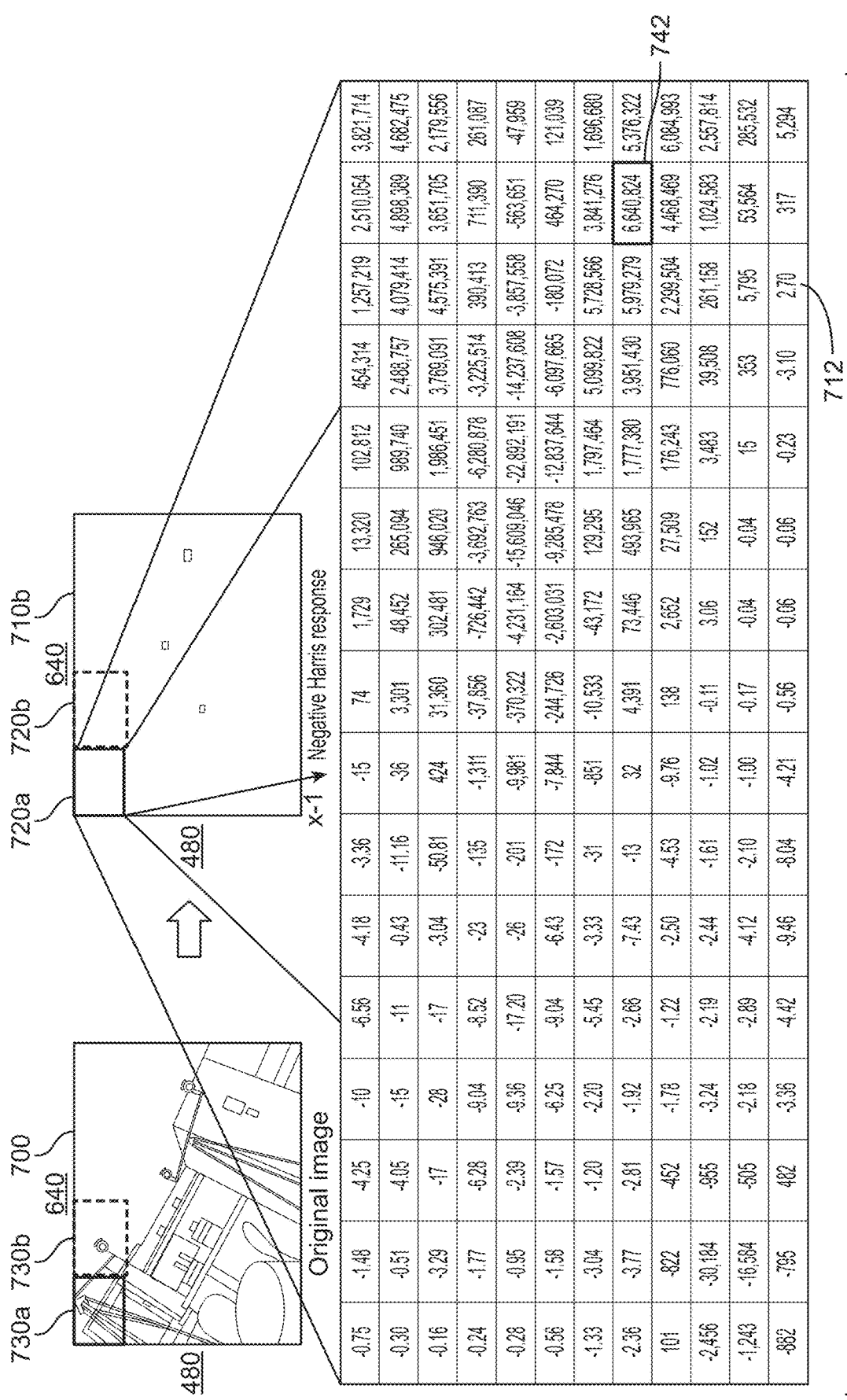

FIG. 14 illustrates the above concept. As shown in the figure, the same response values in the first patch 720a of the feature detection response 710b from FIG. 10 are multiplied by a factor of −1 to obtain a modified first patch 722. The maximum value selector 450 then determines (e.g., selects) one of the response values having the highest value as the maximum value 742. In the illustrated example, the maximum value 742 is "6640824" in the modified first patch 722. The feature identifier 860 identifies a response value as an edge if both conditions are met:
(Condition 1): Response value>Max (first threshold, second threshold), wherein first threshold=maximum response value in the modified first patch×relative factor.
(Condition 2): Response value>all its surrounding values in the 3×3 mask.
In some embodiments, one or both of the above conditions for the modified first patch 722 may be considered a first criterion for identifying edges in the modified first patch 722. Following the above example, the first threshold for the modified first patch 722 is 6640824×0.001=6640.824. Then Max (first threshold, second threshold)=Max (6640.824, 10)=6640.824. Accordingly, the above conditions become:
(Condition 1): Response value>6640.824.
(Condition 2): Response value>all its surrounding values in the 3×3 mask.
In the illustrated example of FIG. 15, the feature identifier 860 identifies two response values 762 in the modified first patch 722 that satisfy both of the above conditions as identified edge(s) for the first patch 720a and for the first region 730a of the image 700.

In the above embodiments, the technique of multiplying the response values 712 in the patch 720 of the feature detection response 710b by a factor of −1 is to identify the lowest negative value for edge identification. In some embodiments, instead of multiplying the response values 712 by the factor of −1, the processing unit 130b may be configured to determine (e.g., select) a minimum response value in the patch 720 (i.e., the negative response value with the highest absolute value) for identifying one or more edges. In some embodiments, instead of or in addition to having the maximum value selector 450, the processing unit 130b may include a minimum value selector. The maximum value selector 450 is configured to determine (e.g., select) the highest positive response value in the patch 720 for corner identification, and the minimum value selector is configured to determine (e.g., select) the lowest negative response value in the patch 720 for edge identification. It should be noted that the term "minimum value selector" is not limited to a module that "selects" and may include a module that performs any of other functions (e.g., calculating, determining, performing MIN function, etc., or any combination of the foregoing) to obtain a minimum value.

In the illustrated embodiments, the above processing may be repeated for additional patches 720 of the feature detection response 710b corresponding to other regions 730 of the image. In particular, the processing unit 130b is also configured to: determine a second maximum value 740 in a modified second patch 722 (e.g., the one represented by the dashed rectangular box multiplied by −1). The feature identifier 860 then identifies a second set of edge(s) 762 for the second region 730b (e.g., the one represented by the dashed rectangular box) of the first image 700 based on a second criterion that relates to the second maximum value 742 in the modified second patch 722.

The above processing may be repeated for all remaining patches 720 and for all remaining regions 730 of the image 700.

Figure 16:
FIG. 16 illustrates exemplary results of output by the processing unit of FIG. 13, particularly showing the results including identified edges in an image.

FIG. 16 illustrates exemplary results of output by the processing unit 130b of FIG. 13, particularly showing the results including identified edges in an image.

As shown in the above example, the same feature detection response 710 may be used to both identify corners and edges. In some embodiments, the same feature detection response 710 may be used to identify other features in images. In some embodiments, the feature detector 830 may have different modules configured to detect different types of features. In such cases, the processing unit 130b may obtain multiple feature detection responses for identifying different types of features in images. In addition, as illustrated in the above example, in some embodiments, the feature identifier 860 may be configured to identify corners and edges based on the same algorithm and criterion, but different feature detection response input. In particular, a first feature detection response may be processed by the feature identifier 860 to identify corners in an image, and a second feature detection response (obtained by multiplying the first feature detection response by −1) may be processed by the feature identifier 860 the same way with the same criterion to identify edges in an image. Thus, the feature identifier 860 may be a corner identifier, an edge identifier, or both. In some embodiments, the processing unit 130*b* may include both a corner identifier and an edge identifier that are different from each other. In further embodiments, the processing unit 10*b* may include a corner identifier, an edge identifier, and one or more other user-defined feature identifiers.

Figure 17:
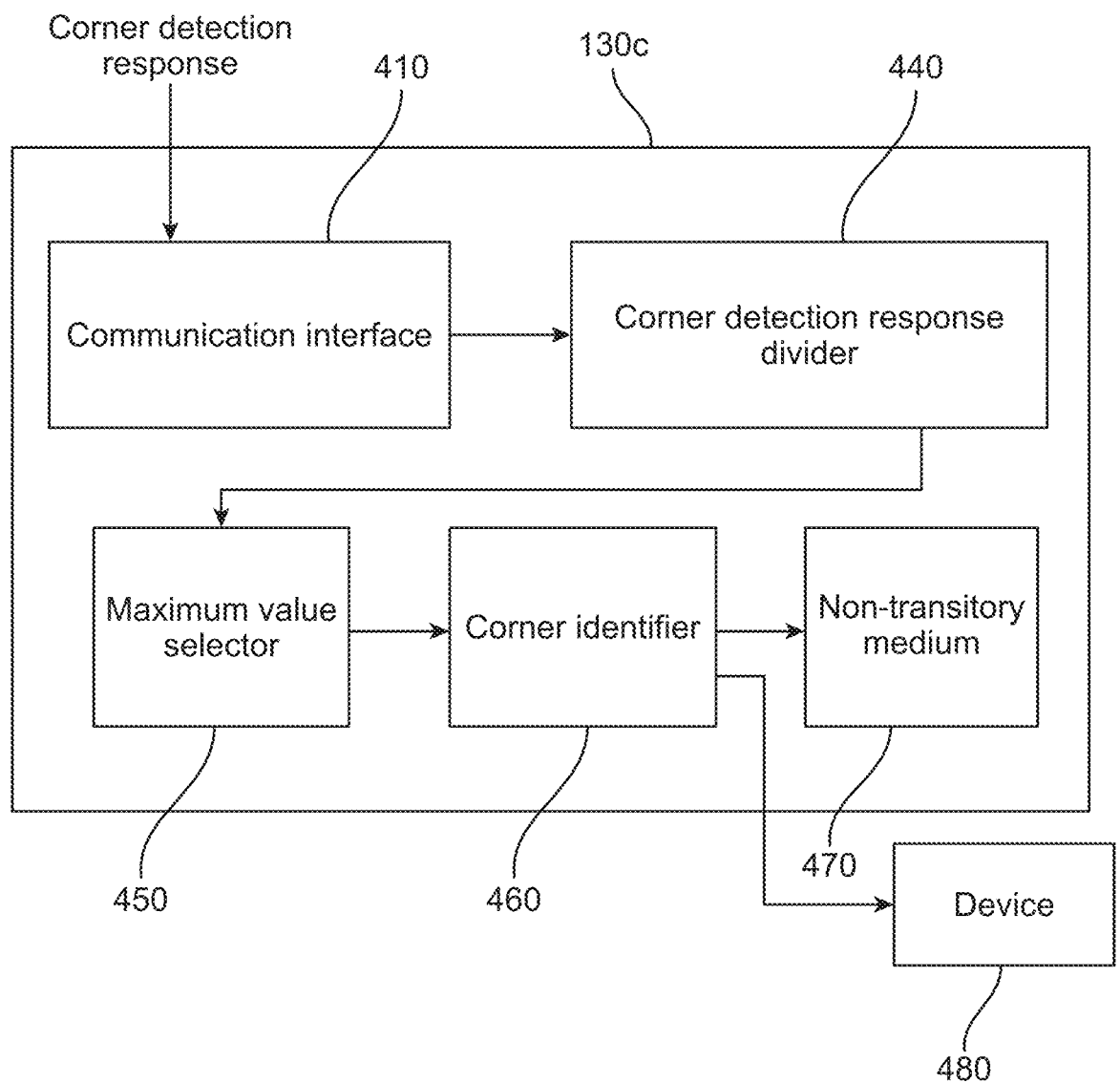
FIG. 17 illustrates another processing unit of an image display device.

In the above embodiments, the processing unit 130 is described as being configured to receive images. In some embodiments, the processing unit 130 does not receive images. Instead, the processing unit 130 may be configured to receive a corner detection response from a device. FIG. 17 illustrates another processing unit 130*c* of an image display device. The processing unit 130*c* of FIG. 17 is the same as that described with reference to FIG. 8, except that the processing unit 130*c* of FIG. 17 does not have the gamma corrector 420 and the corner detector 430. Also, the communication interface 410 is configured to receive corner detection response instead of images. In the illustrated embodiments, a device (e.g., another processing unit that is different from the processing unit 130*c*) is configured to perform gamma correction and corner detection to generate the corner detection response. The corner detection response is then passed to the processing unit 130*c*. The processing performed by the corner detection response divider 440, the maximum value selector 450, and the corner identifier 460 is the same as those described with reference to FIG. 8.

Figure 18:
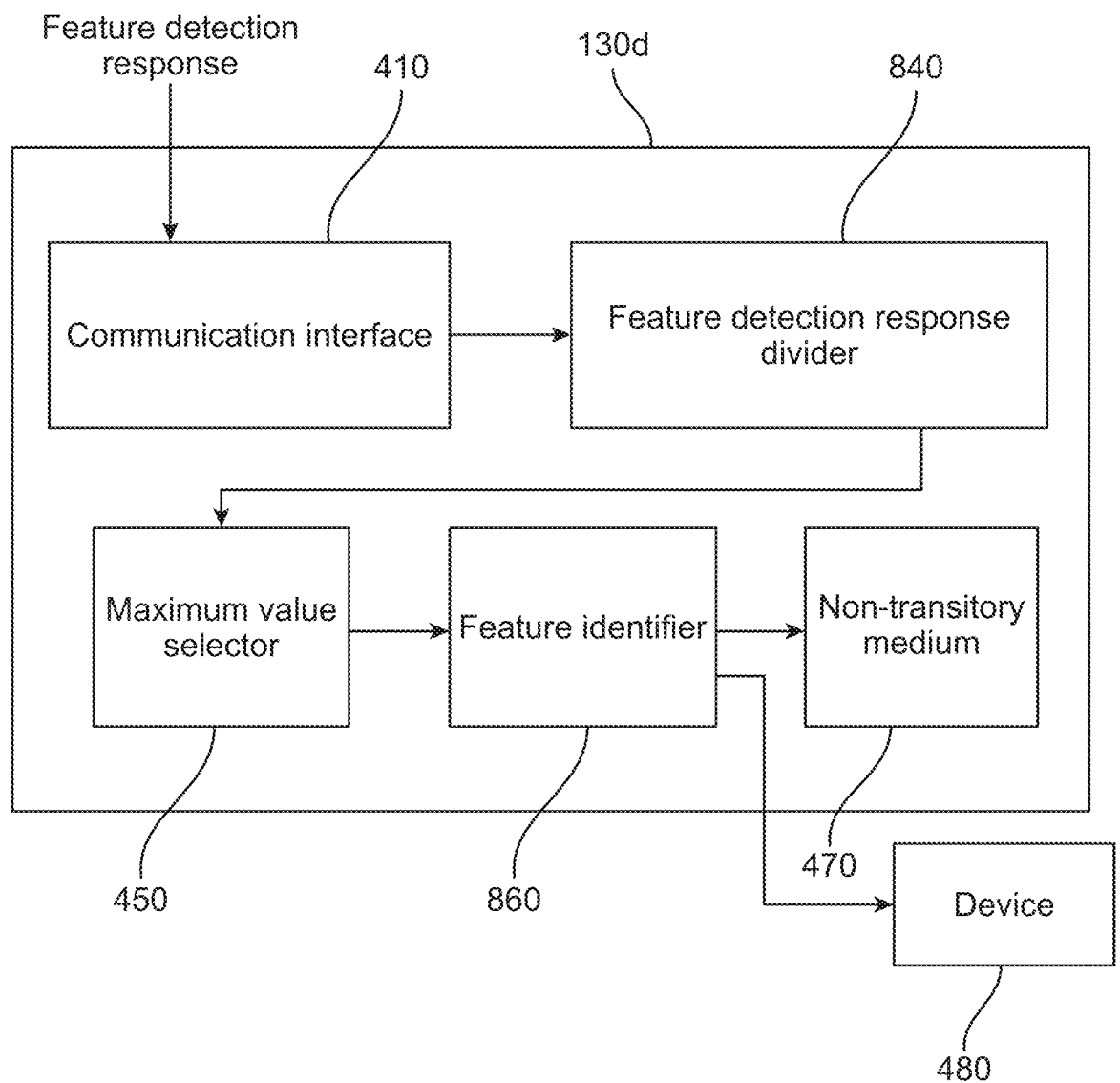
FIG. 18 illustrates another processing unit of an image display device.

Also, described in the above embodiments, the processing unit 130*b* may be configured to identify corners or edges in images. However, the processing unit 130*b* and the method described herein should not be limited to these examples. The processing unit 130 may be configured to identify one or more features (e.g., any user-defined shapes) in images in different embodiments. FIG. 18 illustrates a processing unit 130*d* of an image display device. The processing unit 130*d* of FIG. 18 is the same as that described with reference to FIG. 17, except that the processing unit 130*d* of FIG. 18 has a feature detection response divider 840 (instead of the corner detection response divider 440), and a feature identifier 860 (instead of the corner identifier 460). In some embodiments, the processing unit 130*c* of FIG. 17 may be considered as an example of the processing unit 130*d* of FIG. 18. The processing performed by the feature detection response divider 840 is the same as that described with reference to the corner detection response divider 440, except that the feature detection response divider 840 is configured to divide one or more feature detection responses (instead of just corner detection response). Similarly, the processing performed by the feature identifier 860 is the same as that described with reference to the corner identifier 460, except that the feature identifier 860 is configured to identify one or more features (instead of just corners).

Figure 19:
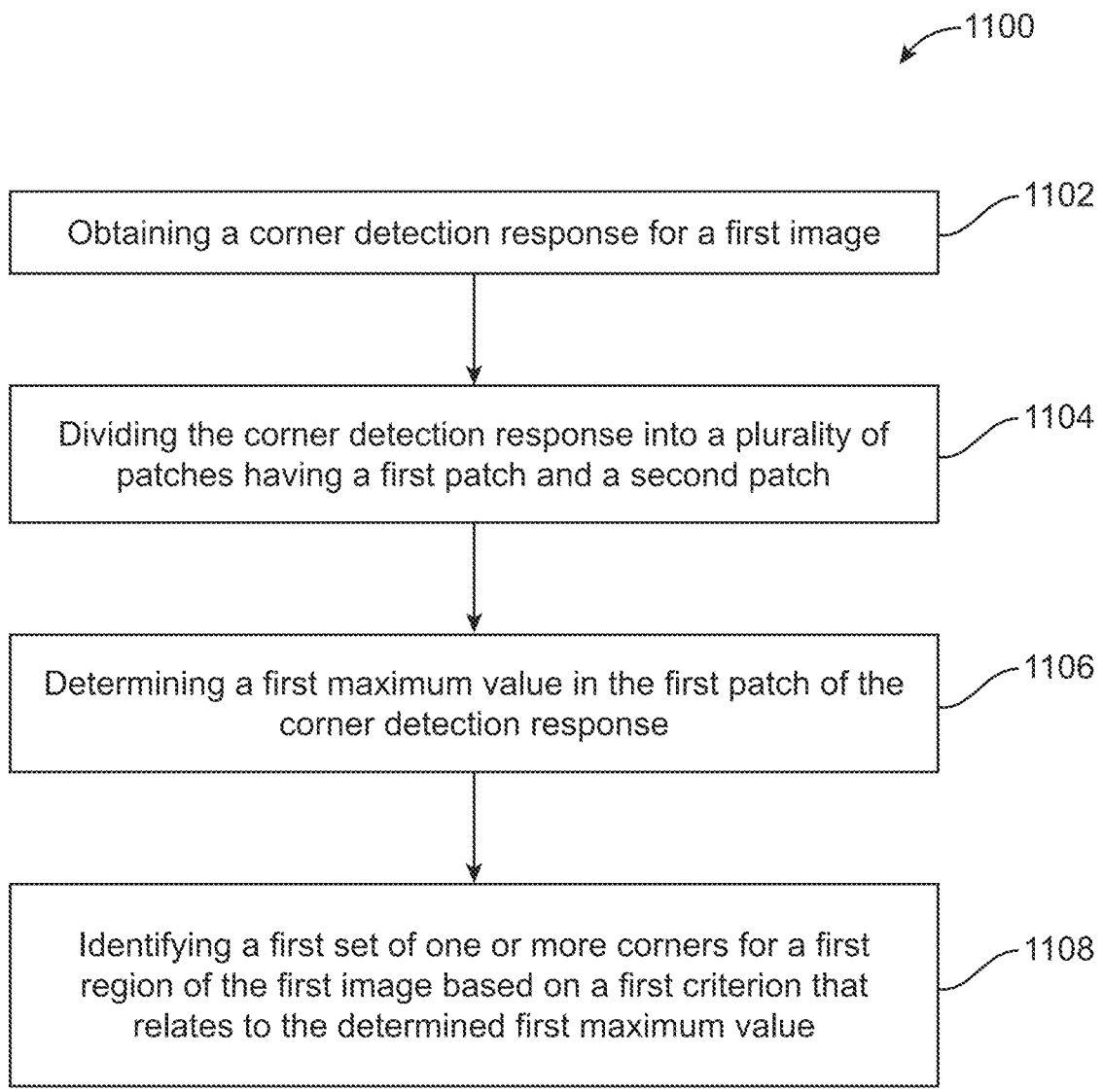
FIG. 19 illustrates a method performed by a processing unit of an image display device.

Method Performed by the Processing Unit and/or Application in the Processing Unit FIG. 19 illustrates a method 1100 in accordance with some embodiments. The method 1000 may be performed by an apparatus that is configured for head-worn by a user, the apparatus having a screen configured to present graphics for the user, a camera system configured to view an environment in which the user is located, and a processing unit. In some embodiments, the method 1100 may be performed by any of the image display devices 101 shown in FIGS. 1-4. For example, the method 1100 may be performed by the processing unit 130 of the image display device 101. The method 1100 includes: obtaining a corner detection response for a first image (item 1102); dividing the corner detection response into a plurality of patches having a first patch and a second patch (item 1104); determining a first maximum value associated with the first patch of the corner detection response (item 1106); and identifying a first set of one or more corners for a first region of the first image based on a first criterion that relates to the determined first maximum value (item 1108).

Optionally, in the method 1100, the first maximum value may be a value in the first patch of the corner detection response.

Optionally, the method 1100 further includes obtaining a relative factor, and multiplying the maximum value by the relative factor to obtain a first threshold value.

Optionally, the method 1100 further includes obtaining a second threshold value, the second threshold value being an absolute threshold.

Optionally, in the method 1100, the criterion comprises a criterion value that is the larger of the first threshold value and the second threshold value.

Optionally, in the method 1100, the act of identifying the first set of one or more corners comprises identifying response value(s) in the first patch of the corner detection response that is larger than the criterion value to identify the one or more corners in the first set.

Optionally, in the method 1100, the one or more corners in the first set is identified also based on a second criterion having a mask size for non-maxima suppression.

Optionally, in the method 1100, the mask size for the non-maxima suppression is 3×3.

Optionally, in the method 1100, the non-maxima suppression is for eliminating duplicate detected corners within a moving mask having the mask size.

Optionally, in the method 1100, the act of identifying comprises determining a pixel in the first region of the first image as a corner (1) if a response value in the corner detection response for the first pixel is larger than a criterion value obtained based on the first maximum value, and (2) if the response value for the first pixel is larger than all surrounding values in a mask with the mask size.

Optionally, in the method 1100, the condition (1) is the first criterion, and the condition (2) is the second criterion.

Optionally, the method 1100 further includes: determining a second maximum value in the second patch of the corner detection response, and identifying a second set of one or more corners in a second region of the first image based on a second criterion that relates to the second maximum value.

Optionally, in the method 1100, the act of obtaining the first image is performed by an interface of a processing unit.

Optionally, in the method 1100, the act of obtaining the corner detection response comprises performing corner detection on the first image, or receiving the corner detection response from a device that is configured to perform corner detection on the first image.

Optionally, in the method 1100, the act of obtaining the corner detection response comprises performing corner detection on the first image.

Optionally, in the method 1100, the corner detection is performed by a corner detector based on a Scale-Invariant Feature Transform (SIFT) algorithm, a Features from Accelerated Segment Test (FAST) algorithm, or a Shi-Thomasi algorithm.

Optionally, in the method 1100, the act of dividing the corner detection response is performed by a divider.

Optionally, in the method 1100, the act of determining the first maximum value is performed by a selector selecting a response value from a plurality of response values in the corner detection response that has the highest value as the first maximum value.

Optionally, in the method 1100, the act of identifying comprises determining a pixel in the first region of the first image as a corner (1) if a response value in the corner detection response for the first pixel is larger than a criterion value obtained based on the first maximum value, and (2) if the response value for the first pixel is larger than all surrounding values in a non-maxima suppression mask.

Optionally, the method 1100 further includes creating a map based at least in part on the first set of the one or more corners, and performing localization of the user based on the created map.

Optionally, the method 1100 further includes operating a screen to display a graphic representing the one or more corners in the first set.

Optionally, the method 1100 further includes storing information regarding the first set of the one or more corners in a non-transitory medium.

In other embodiments, in item 1102, instead of obtaining a corner detection response, the method 1100 may include the act of obtaining a feature detection response. The feature detection response may be a corner detection response, an edge detection response, or a user-defined-feature detection response.

Similarly, in other embodiments, in item 1104, instead of dividing the corner detection response into a plurality of patches, the method 1100 may include the act of dividing the feature detection response into the plurality of patches.

Specialized Processing System

In some embodiments, the method 1100 described herein may be performed by the processing unit 130 executing an application, or by the application. The application may contain a set of instructions. In one implementation, a specialized processing system having a non-transitory medium storing the set of instruction for the application may be provided. The execution of the instruction by the processing unit 130 of the image display device 101 will cause the processing unit 130 to perform the features described herein. For example, in some embodiments, an execution of the instructions by a processing unit of a head-worn image display device will cause the method 1100 to be performed.

In some embodiments, the image display device 101 may also be considered as a specialized processing system. In particular, the image display device 101 is a specialized processing system in that it contains instruction stored in its non-transitory medium for execution by the processing unit 130 to provide unique tangible effects in a real world. The features provided by the image display device 101 (as a result of the processing unit 130 executing the instruction) provide improvements in the technological field of corner detection, localization map creation, and image-based localization.

Figure 20:
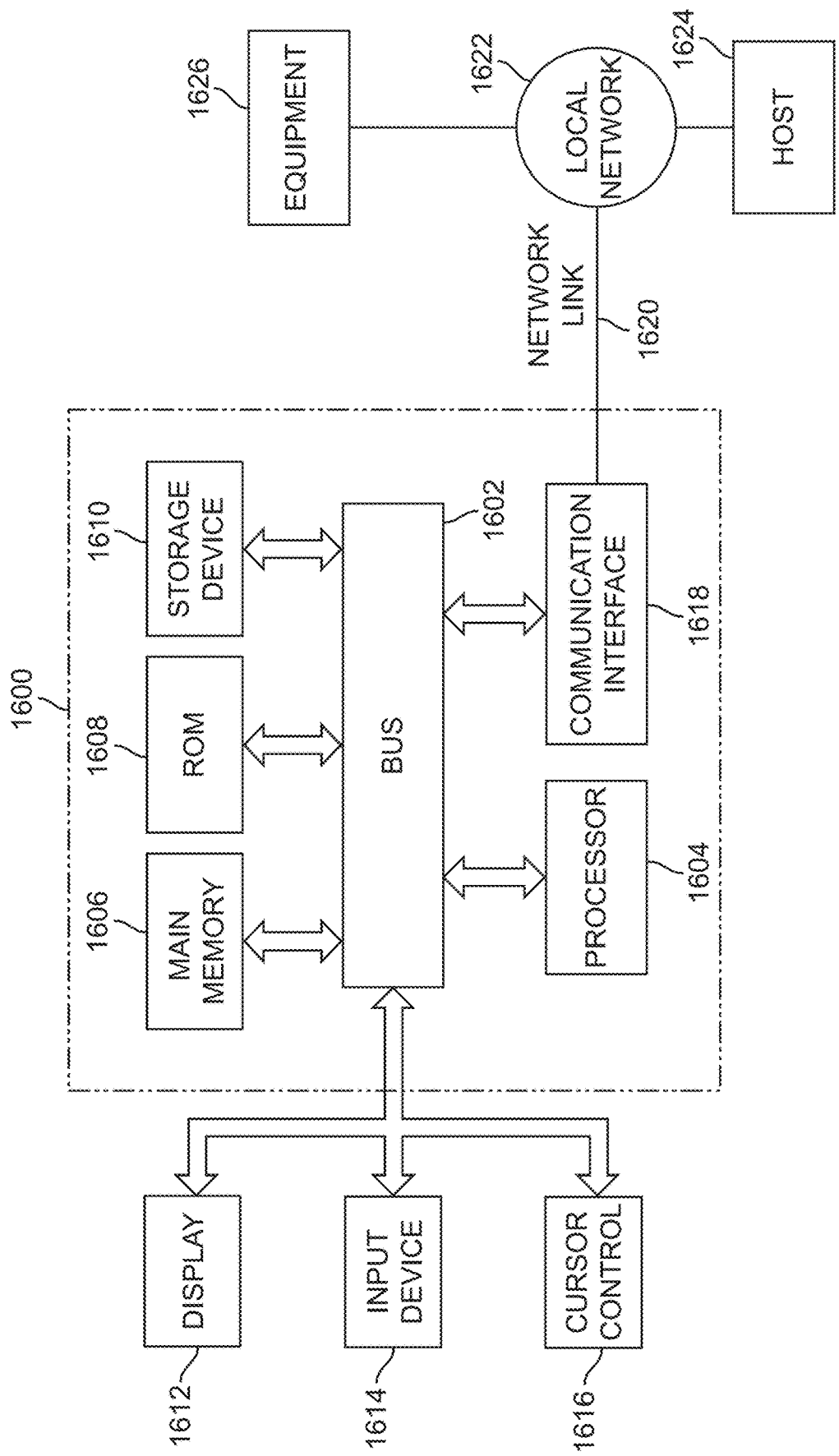
FIG. 20 illustrates a specialized processing system in accordance with some embodiments.

FIG. 20 is a block diagram illustrating an embodiment of a specialized processing system 1600 that can be used to implement various features described herein. For example, in some embodiments, the processing system 1600 may be used to implement the image display device 101. Also, in some embodiments, the processing system 1600 may be used to implement the processing unit 130, or one or more components therein (e.g., the communication interface 410, the gamma corrector 420, the feature detector 430, the feature detection response divider 440, the maximum value selector 450, the feature identifier 460, etc.).

The processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk, solid state disk, or optical disk, is provided and coupled to the bus 1602 for storing information and instructions.

The processor system 1600 may be coupled via the bus 1602 to a display 1612, such as a screen, for displaying information to a user. In some cases, if the processing system 1600 is part of the apparatus that includes a touch-screen, the display 1612 may be the touch-screen. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In some cases, if the processing system 1600 is part of the apparatus that includes a touch-screen, the input device 1614 and the curser control may be the touch-screen.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical, solid state or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a flexible disk, hard disk, magnetic tape, or any other magnetic medium, a CD-ROM, any other optical medium, any other physical medium with patterns of holes, a RAM, a PROM, and EPROM, a FLASH-EPROM, solid state disks any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk or solid state disk of a remote computer. The remote computer can load the instructions into its dynamic memory and send the instructions over a network, such as the Internet. The processing system 1600 can receive the data on a network line. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626.

The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

It should be noted that the term "image", as used in this specification, may refer to image that is displayed, and/or image that is not in displayed form (e.g., image that is stored in a medium, or that is being processed).

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. It is further noted that any claim may be drafted to exclude any optional element. As such, this statement is intended to serve as antecedent basis for use of such exclusive terminology as "solely," "only" and the like in connection with the recitation of claim elements, or use of a "negative" limitation.

In addition, as used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. An apparatus configured for head-worn by a user, comprising:
 a screen configured to present graphics for the user;
 a camera system configured to view an environment in which the user is located; and
 a processing unit comprises of a processor is coupled to the camera system, the processing unit configured to:
  obtain a feature detection response for a first image,
  divide the feature detection response into a plurality of patches, the plurality of patches comprises an array of patches, the array having rows and columns, the plurality of patches having a first patch and a second patch,
  determine a first maximum value associated with the first patch of the feature detection response, wherein the processing unit is configured to determine the first maximum value for a first region of the first image, and identify a first set of one or more features for the first region of the first image based on a first criterion that relates to the first maximum value determined for the first region of the first image;

wherein the processing unit is also configured to obtain a relative factor, and multiply the maximum value by the relative factor to obtain a first threshold value, and obtain a second threshold value, the second threshold value being an absolute threshold, and wherein the first criterion comprises a criterion value that is the larger of the first threshold value and the second threshold value.

2. The apparatus of claim 1, wherein the one or more features comprises one or more corners, one or more edges, or one or more user-defined shapes.

3. The apparatus of claim 1, wherein the processing unit is configured to identify response value(s) in the first patch of the feature detection response that is larger than the criterion value to identify the one or more features in the first set.

4. The apparatus of claim 1, wherein the processing unit is configured to identify the one or more features in the first set also based on a second criterion having a mask size for non-maxima suppression.

5. The apparatus of claim 4, wherein the mask size for the non-maxima suppression is 3×3.

6. The apparatus of claim 4, wherein the non-maxima suppression is for eliminating duplicate detected features within a moving mask having the mask size.

7. The apparatus of claim 4, wherein the processing unit is configured to identify one of the one or more features (1) if a response value in the feature detection response for the pixel is larger than a criterion value obtained based on the first maximum value, and (2) if the response value for the pixel is larger than all surrounding values in a mask with the mask size.

8. The apparatus of claim 7, wherein the condition (1) is the first criterion, and the condition (2) is the second criterion.

9. The apparatus of claim 1, wherein the processing unit is also configured to:
determine a second maximum value in the second patch of the feature detection response, wherein the processing unit is configured to determine the second maximum value for a second region of the first image, and
identify a second set of one or more features in the second region of the first image based on a second criterion that relates to the second maximum value.

10. The apparatus of claim 1, wherein the processing unit is configured to obtain the feature detection response by performing feature detection on the first image, or by receiving the feature detection response from a device that is configured to perform feature detection on the first image.

11. The apparatus of claim 1, wherein the processing unit comprises a feature detector configured to perform feature detection to obtain the feature detection response.

12. The apparatus of claim 11, wherein the feature detector is configured to perform the feature detection based on a Scale-Invariant Feature Transform (SIFT) algorithm, a Features from Accelerated Segment Test (FAST) algorithm, or a Shi-Thomasi algorithm.

13. The apparatus of claim 1, wherein the processing unit comprises a divider configured to divide the feature detection response into the plurality of patches, and a selector configured to select a response value from a plurality of response values in the feature detection response that has the highest value as the first maximum value.

14. The apparatus of claim 1, wherein the processing unit is configured to identify one of the one or more features (1) if a response value in the feature detection response for the pixel is larger than a criterion value obtained based on the first maximum value, and (2) if the response value for the pixel is larger than all surrounding values in a non-maxima suppression mask.

15. The apparatus of claim 1, wherein the processing unit is configured to create a map based at least in part on the first set of the one or more features, and to perform localization of the user based on the created map.

16. A method performed by a head-worn image display device, comprising:
obtaining a feature detection response for a first image;
dividing the feature detection response into a plurality of patches, the plurality of patches comprises an array of patches, the array having rows and columns, the plurality of patches having a first patch and a second patch;
determining a first maximum value associated with the first patch of the feature detection response, wherein the first maximum value is determined for a first region of the first image; and
identifying a first set of one or more features for the first region of the first image based on a first criterion that relates to the first maximum value determined for the first region of the first image;
wherein the method further comprises obtaining a relative factor, and multiplying the maximum value by the relative factor to obtain a first threshold value, and obtaining a second threshold value, the second threshold value being an absolute threshold, wherein the first criterion comprises a criterion value that is the larger of the first threshold value and the second threshold value.

17. The method of claim 16, wherein the act of identifying the first set of one or more features comprises identifying response value(s) in the first patch of the feature detection response that is larger than the criterion value to identify the one or more features in the first set.

18. The method of claim 16, wherein the one or more features in the first set is identified also based on a second criterion having a mask size for non-maxima suppression, wherein the non-maxima suppression is for eliminating duplicate detected features within a moving mask having the mask size.

19. The method of claim 18, wherein one of the one or more features is identified (1) if a response value in the feature detection response for the pixel is larger than a criterion value obtained based on the first maximum value, and (2) if the response value for the pixel is larger than all surrounding values in a mask with the mask size; and
wherein the condition (1) is the first criterion, and the condition (2) is the second criterion.

20. The method of claim 16, further comprising:
determining a second maximum value in the second patch of the feature detection response, wherein the second maximum value is determined for a second region of the first image, and
identifying a second set of one or more features in the second region of the first image based on a second criterion that relates to the second maximum value.

21. The method of claim 16, wherein the act of obtaining the feature detection response comprises performing feature detection on the first image.

22. The method of claim 21, wherein the feature detection is performed by a feature detector based on a Scale-Invariant Feature Transform (SIFT) algorithm, a Features from Accelerated Segment Test (FAST) algorithm, or a Shi-Thomasi algorithm.

23. The method of claim 16, wherein the act of determining the first maximum value is performed by a selector selecting a response value from a plurality of response values in the feature detection response that has the highest value as the first maximum value.

24. The method of claim 16, wherein one of the one or more features is identified (1) if a response value in the feature detection response for the pixel is larger than a criterion value obtained based on the first maximum value, and (2) if the response value for the pixel is larger than all surrounding values in a non-maxima suppression mask.

25. The method of claim 16, further comprising creating a map based at least in part on the first set of the one or more features, and performing localization of the user based on the created map.

26. An apparatus configured for head-worn by a user, comprising:
   a screen configured to present graphics for the user;
   a camera system configured to view an environment in which the user is located; and
   a processing unit comprises of a processor is coupled to the camera system, the processing unit configured to:
      obtain a feature detection response for a first image,
      divide the feature detection response into a plurality of patches, the plurality of patches comprises an array of patches, the array having rows and columns, the plurality of patches having a first patch and a second patch,
      determine a first maximum value associated with the first patch of the feature detection response, wherein the processing unit is configured to determine the first maximum value for a first region of the first image, and
      identify a first set of one or more features for the first region of the first image based on a first criterion that relates to the first maximum value determined for the first region of the first image;
   wherein the first criterion that relates to the first maximum value comprises a first criterion value, and wherein the first criterion value (1) is different from the first maximum value determined for the first region of the first image and (2) is based on a max (x, y) function, wherein x in the max(x, y) function is the first maximum value times a factor, and y in the max(x, y) function is a parameter value that is different from the first maximum value.

27. A method performed by a head-worn image display device, comprising:
   obtaining a feature detection response for a first image;
   dividing the feature detection response into a plurality of patches, the plurality of patches comprises an array of patches, the array having rows and columns, the plurality of patches having a first patch and a second patch;
   determining a first maximum value associated with the first patch of the feature detection response, wherein the first maximum value is determined for a first region of the first image; and
   identifying a first set of one or more features for the first region of the first image based on a first criterion that relates to the first maximum value determined for the first region of the first image;
   wherein the first criterion that relates to the first maximum value comprises a first criterion value, and wherein the first criterion value (1) is different from the first maximum value determined for the first region of the first image and (2) is based on determined based on a max (x, y) function, wherein x in the max(x, y) function is the first maximum value times a factor, and y in the max (x, y) function is a parameter value that is different from the first maximum value.

* * * * *